(12) United States Patent
Owens, II et al.

(10) Patent No.: US 7,428,585 B1
(45) Date of Patent: Sep. 23, 2008

(54) LOCAL DEVICE ACCESS CONTROLS

(75) Inventors: John Barclay Owens, II, Gainesville, VA (US); Patrick Meenan, Gainesville, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 948 days.

(21) Appl. No.: 10/630,910

(22) Filed: Jul. 31, 2003

Related U.S. Application Data

(63) Continuation-in-part of application No. 10/208,203, filed on Jul. 31, 2002.

(51) Int. Cl.
*G06F 15/173* (2006.01)
*G06F 15/16* (2006.01)

(52) U.S. Cl. .................. 709/223; 709/225; 709/224; 709/229

(58) Field of Classification Search ........... 709/223, 709/225
See application file for complete search history.

(56) References Cited

U.S. PATENT DOCUMENTS

| | | | |
|---|---|---|---|
| 5,497,504 A | | 3/1996 | Acampora et al. |
| 5,619,716 A | * | 4/1997 | Nonaka et al. ............. 717/167 |
| 5,706,507 A | | 1/1998 | Schloss |
| 5,907,831 A | | 5/1999 | Lotvin et al. |
| 5,918,019 A | | 6/1999 | Valencia |
| 5,987,611 A | * | 11/1999 | Freund ........................ 726/4 |
| 6,065,055 A | * | 5/2000 | Hughes et al. ............. 709/229 |
| 6,119,165 A | | 9/2000 | Li et al. |
| 6,199,204 B1 | * | 3/2001 | Donohue .................... 717/178 |
| 6,337,899 B1 | | 1/2002 | Alcendor et al. |
| 6,501,741 B1 | | 12/2002 | Mikkonen et al. |
| 6,606,659 B1 | | 8/2003 | Hegli et al. |
| 6,684,240 B1 | * | 1/2004 | Goddard ..................... 709/217 |
| 6,704,031 B1 | | 3/2004 | Kimball et al. |
| 6,732,179 B1 | * | 5/2004 | Brown et al. ............... 709/229 |
| 6,745,367 B1 | * | 6/2004 | Bates et al. ................. 709/224 |
| 6,795,856 B1 | * | 9/2004 | Bunch ........................ 709/224 |
| 6,854,009 B1 | * | 2/2005 | Hughes ....................... 709/220 |

(Continued)

FOREIGN PATENT DOCUMENTS

CA 2312460 2/2001

(Continued)

OTHER PUBLICATIONS

Symborski. "Updating Software and Configuration Data in a Distributed Communications Network". 1988. Proceedings of the Computer Networking Symposium. pp. 331-338. <http://ieeexplore.ieee.org/iel2/194/269/00005011.pdf?arnumber=5011>.*

(Continued)

*Primary Examiner*—Jason Cardone
*Assistant Examiner*—Jeffrey R Swearingen
(74) *Attorney, Agent, or Firm*—Fish & Richardson P.C.

(57) ABSTRACT

Using parental controls includes storing parental control information on a user device and receiving a request from the user device to access a destination over a communications network. Parental control information stored on the user device may be used to determine whether to grant the request from the user device. When the parental control information indicates that the request should be allowed, the user device allows access to the destination. When the parental control information indicates that the request should be denied, the user device denies access to the destination. Information that is related to the parental control information stored on the user device may be stored on a remote device. The parental control information stored on the user device may be verified using the information stored on the remote device.

37 Claims, 13 Drawing Sheets

U.S. PATENT DOCUMENTS

| | | | |
|---|---|---|---|
| 6,938,077 B2 * | 8/2005 | Sanders | 709/219 |
| 7,039,700 B2 * | 5/2006 | Saeidi | 709/224 |
| 7,124,938 B1 | 10/2006 | Marsh | |
| 7,302,488 B2 * | 11/2007 | Mathew et al. | 709/229 |
| 2002/0049806 A1 | 4/2002 | Gatz et al. | |
| 2002/0116471 A1 | 8/2002 | Shteyn | |
| 2002/0147782 A1 * | 10/2002 | Dimitrova et al. | 709/207 |
| 2003/0005455 A1 | 1/2003 | Bowers | |
| 2003/0046413 A1 | 3/2003 | Sakakura | |

FOREIGN PATENT DOCUMENTS

| | | |
|---|---|---|
| WO | WO 99/19988 | 4/1999 |

OTHER PUBLICATIONS

Balkin et al. "Filtering the Internet: A Best Practices Model". Sep. 15, 1999. Yale Law School. <http://www.yale.edu/lawweb/jbalkin/articles/Filters0208.pdf>.*

Jacob, Varghese et al. "Filtering Objectionable Internet Content." Proceeding of the 20th International Conference on Information Systems. Jan. 1999. Association for Information Systems.*

Urbaczewski, Andrew et al. "Does Electronic Monitoring of Employee Internet Usage Work?" Communications of the ACM. vol. 45, No. 1. Jan. 2002. ACM Press. 80-83.*

"PPP over Ethernet: A Comparison of Alternatives for PC-to-xDSL Modem Connectivity," Redback Networks, Mar. 1999, pp. 1-8.

Townsley, W., et al., "Layer Two Tunneling Protocol 'L2TP'", The Internet Society, 1999, pp. 1-80.

Evans, Shara, "Standards Watch: Tunnelling Through the Web," Mar. 1999, Telsyte—Telecommunications Strategic Planning.

"Intel Introduces High Speed Wireless Networking Products Designed for the Home and Small Office," M2 Communications Ltd., 2001, pp. 1-3.

"Embedded Web Guru Co-Authors New Security Standard, Digest Authentication Provides Secure Web Login," Business Wire, Jun. 14, 1999, pp. 1-2.

Agranat, Ian, "Authentication Standardizes Web," *Electronic Engineering Times*, No. 1018, p. 78, Jul. 27, 1998.

Prosise, Jeff, "ASP.NET Security: An Introductory Guide to Building and Deploying More Secure Sites with ASP.NET and IIS," *MSDN Magazine*, vol. 17, No. 4, p. 54, Apr. 30, 2002.

* cited by examiner

LOCAL DEVICE ACCESS CONTROLS

CROSS REFERENCE TO RELATED APPLICATIONS

This application is a continuation-in-part of U.S. patent application Ser. No. 10/208,203, filed Jul. 31, 2002, and titled "Mirroring and Validating Parental Control Information," which is incorporated by reference.

TECHNICAL FIELD

This description relates to communicating between two systems.

BACKGROUND

When two systems communicate, a device or an identity using a device in one of the systems typically is identified to the other system. For example, a device or an associated identity in a client system may be identified to a host system. The identification of a device or an identity may permit a host system to make specific features or information available or unavailable to the device or the identity using the device.

For instance, in a household that includes more than one personal computing device, it may be desirable to enable a connection between each device and an online service provider (OSP). It is possible to simply network several devices together in the home to enable interconnectivity among the devices and to enable a connection to outside host systems. With the devices networked together using a home network, the host system may recognize the entire network as a single device.

SUMMARY

In one general aspect, using parental controls includes storing parental control information on a user device and receiving a request from the user device to access a destination over a communications network. Parental control information stored on the user device may be used to determine whether to grant the request from the user device. When the parental control information indicates that the request should be allowed, the user device allows access to the destination. When the parental control information indicates that the request should be denied, the user device denies access to the destination. Information that is related to the parental control information stored on the user device may be stored on a remote device. The parental control information stored on the user device may be verified using the information stored on the remote device.

Implementations may include one or more of the following features. For example, the information stored on the remote device may include a checksum of a version of the parental control information stored on the user device and the parental control information stored on the user device may be verified using the checksum stored on the remote device. The information stored on the remote device may include a copy of a version of the parental control information stored on the user device and the parental control information stored on the user device may be verified using the copy of the parental control information stored on the remote device. The information stored on the remote device may include a checksum and a copy of the parental control information stored on the user device and the parental control information stored on the user device may be verified using the checksum or the copy of the parental control information stored on the remote device.

The information stored on the remote device may be used to determine whether the parental control information stored on the user device has changed. The information stored on the remote device may be used periodically and/or based on an occurrence of an event to determine whether the parental control information stored on the user device has changed.

The parental control information stored on the user device may include a checksum computed from the version of the parental control information stored on the user device for the parental controls and the parental control information stored on the user device may be verified by comparing the checksum stored on the remote device with the checksum stored on the user device. The parental control information stored on the user device may be updated when the checksum stored on the user device does not match the checksum stored on the remote device. A message may be sent to an identity when the checksum generated from the version of the parental control information stored on the user device does not match the checksum stored on the remote device. A message may be sent to a master user associated with an identity when the checksum generated from the parental control information stored on the user device does not match the checksum stored on the remote device.

The parental control information stored on the user device may be verified by comparing the copy of the parental control information stored on the remote device with the parental control information stored on the user device, and when the parental control information stored on the user device does not match a copy of the parental control information stored on the remote device, the parental control information stored on the user device may be updated. A message may be sent to an identity when the information relating to the parental control information stored on the user device does not match the copy of the parental control information stored on the remote device. A message may be sent to a master user associated with an identity when the information relating to the parental control information stored on the user device does not match the copy of the parental control information stored on the remote device.

The parental control information may include parental control information that is based on age-appropriateness of the content. The parental control information may be indicative of an identity that is signed into a user device. The communications network may include the Internet. The destination may include a web site.

These general and specific aspects may be implemented using a system, a method, or a computer program, or any combination of systems, methods, and computer programs.

Other features will be apparent from the description and drawings, and from the claims.

For brevity, several elements in the figures are represented as monolithic entities. However, as would be understood by one skilled in the art, these elements each may include numerous interconnected computers and components designed to perform a set of specified operations and/or dedicated to a particular geographical region.

DETAILED DESCRIPTION

In one exemplary implementation, parental control information may be stored on a local user device and applied to communications between the local user device and a destination. The integrity of the parental control information stored on the local user device may be maintained by storing on a remote device (e.g., a device in a host system) information that is related to the parental control information stored on the local user device and using the information stored on the remote device to verify that there have not been any unauthorized changes to the parental control information stored on the local user device. The information stored on the remote device may include, for example, a checksum and/or a copy of the parental control information.

Figure 1:
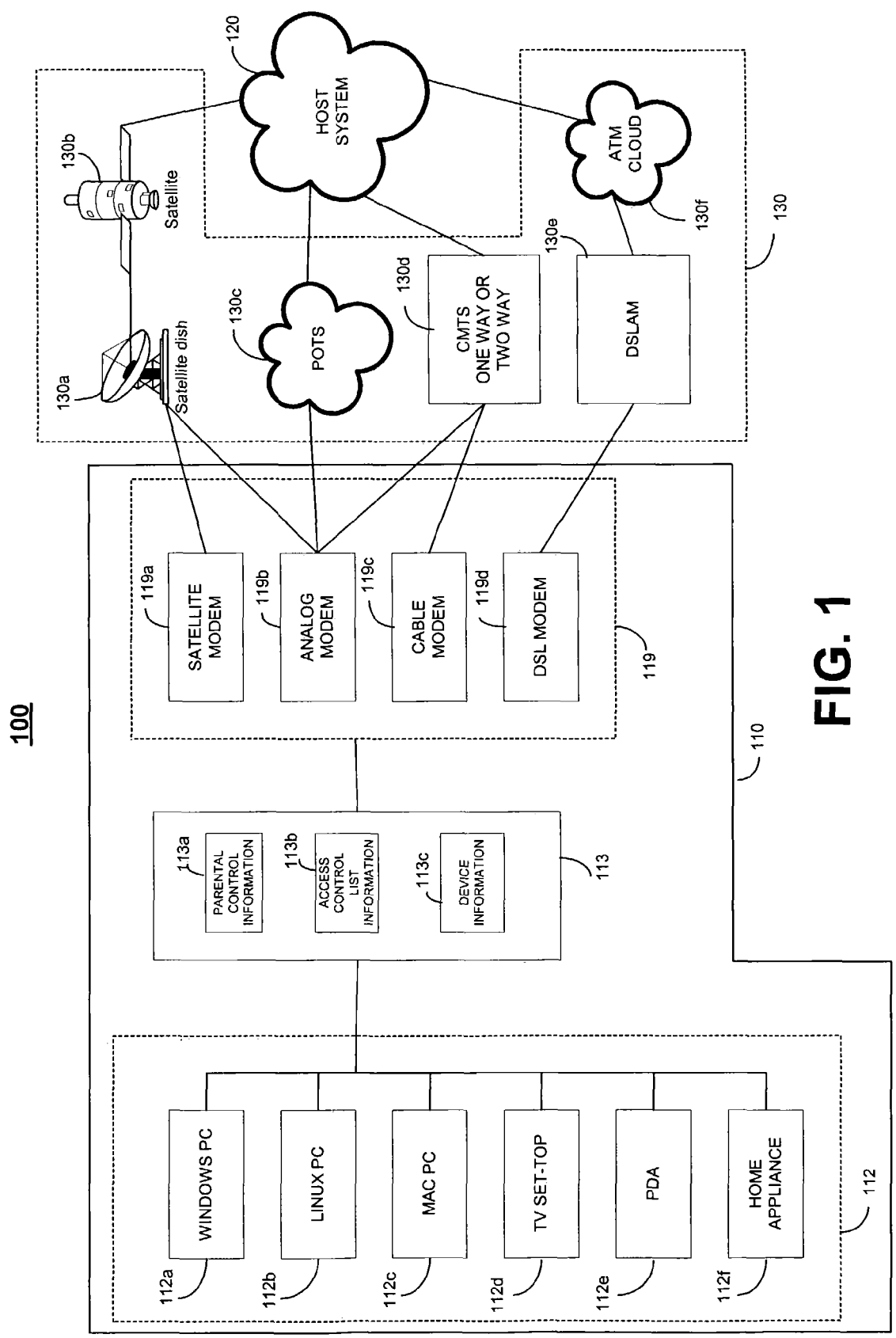
FIGS. 1 and 2 are block diagrams illustrating communications systems capable of establishing parental control for a device used in a home network.

Referring to FIG. 1, a home networking system 100 may include multiple home-networked devices 112 ("devices") connected to each other and to a local proxy 113. The local proxy 113 typically connects to a host system 120 through a communication device 119 over communication links 130.

The home networking system 100 enables the devices 112 to communicate with the host system 120 through the local proxy 113 using the single communication device 119. The devices 112, the local proxy 113, and the communication device 119 may be a client system 110 physically located in a personal residence.

The home networking system 100 also enables the devices 112 to access information maintained by the host system 120 for a particular client device 112 or a particular individual using one of the devices 112. In addition, the home networking system 100 may enable the host system 120 to maintain and enforce individual preferences or restrictions associated with a particular client device 112 or a user of the particular client device 112. This may be accomplished through use of unique identifiers, which may be assigned by the host, the client, or another entity. Unique identifiers may be used alone or in combination with other identifiers. Identifiers may include login name, account number, screen name, and password.

Recognition of the particular devices 112 or the users of the devices permits the host system 120 to enforce or enable preferences and features, such as access controls (e.g., parental controls) or features available to a specific communication platform or environment. Similarly, the host system's recognition of or distinction among devices and users permits the individual client devices and users to access and receive back from the host certain host-maintained preferences, such as personal identification settings, personal web pages, account information, wallet information, and/or financial information.

When client and host systems communicate, the client system 110 may provide identifying information that is used by the host system 120 to determine whether to present (or restrict) information or features. However, in some contexts, the identifying information provided by the client system may not enable the host system to identify a particular client device that is communicating with the host system or the particular person using the communicating client device. This is particularly true in a home-networking environment in which several devices within the home network may communicate through a single access point (e.g., a network access translator (NAT) or other routing device) that purposefully disguises the device identities and in which more than one person may communicate using any one of the several devices.

The local proxy 113 that is located between the client devices 112 and the host system 120 may be used to identify, or provide information about, a client device or a user of a client device that accesses the host system. The local proxy may append information to communications sent by the client device. For instance, the local proxy may append information that identifies or relates to the parental control classification of the user of the client device, the type of the client device, the platform of the client device, the protocol of a system being accessed by the client device, or the operating environment of the client device. The host system may provide, or restrict, access to information or features based on the information appended to communications sent by the client device.

The local proxy generally is local to the client or client network and physically located in a personal residence. The local proxy generally is positioned between the client device and a host system external to the client system. The host system may be, for example, an Internet access provider device, a host system proxy server, or another external system device.

The local proxy may store an additional copy of (or mirror) parental control information associated with one or more users or client devices. The local proxy may be used to restrict communications based on the parental control classification of a user or a device and/or may be used to verify that parental control information has not been improperly modified or accessed.

The devices 112 and the local proxy 113 typically are located in a physical place that enables the local proxy 113 to network with the devices 112. In one implementation, for example, the local proxy 113 is physically located in a personal residence (e.g., a single-family dwelling, a house, a townhouse, an apartment, or a condominium). The devices 112 may be physically located such that communications with the local proxy 113 are enabled and maintained. For instance, when the local proxy 113 is physically located in a personal residence, the devices 112 also may be physically located in the personal residence. The location of the local proxy 113 in the personal residence does not necessarily preclude one or more of the devices 112 from being networked to the local proxy 113 from a remote location. Similarly, the location of the local proxy does not necessarily preclude use of one or more of the devices 112 from outside of the personal residence or communication by those devices with the host system 120 through the local proxy 113. For instance, the devices 112 may include one or more portable computing devices that may be taken outside of the personal residence and still remain connected to the local proxy 113 located within the personal residence through a wireless network 110.

The devices 112 may include one or more general-purpose computers (e.g., personal computers), one or more special-purpose computers (e.g., devices specifically programmed to communicate with the local proxy 113 and/or the host system 120), or a combination of one or more general-purpose computers and one or more special-purpose computers. Other examples of devices 112 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture.

FIG. 1 shows several implementations and possible combinations of devices and systems used within the home networking system 100. Examples of devices 112 may include, but are not limited to, a personal computer with a Windows™ OS 112a, a personal computer with a Linux™-based OS 112b, a Macintosh™ personal computer 112c, a TV set-top box 112d, a PDA 112e, and a home appliance 112f. The devices 112 are connected through a network to the local proxy 113.

Some of the devices 112, such as a personal computer with Windows™ OS 112a, a personal computer with a Linux™-based OS 112b, a Macintosh™ personal computer 112c, and a PDA 112e, include software for logging on to the host system 120 using a particular identity associated with the user of the device. Such devices may be referred to as client devices. Other devices, such as a home appliance 112f, may include software for logging on to host system 120 without identifying an associated identity of the user of the device and may be referred to as non-client devices. Yet other devices, such as a TV set-top 112d, may be able to function either as a client device or a non-client device depending on the function being performed.

The local proxy 113 may be a protocol server module, such as the protocol server module 213 discussed below with respect to FIG. 2; a home gateway device, a router, or another communications device; and/or a home entertainment device, such as a stereo system, a radio tuner, a TV tuner, a portable music player, a personal video recorder, or a gaming device. The local proxy 113 may be referred to as a client-side proxy. The local proxy 113 is separated from the host system 120 by communications links 130. In some implementations, host system 120 may be an online access provider, such as an Internet access provider. The online access provider is separated from the local proxy 113 by communications links 130.

The local proxy 113 typically connects to the host system 120 using a communication device 119. Examples of the communication device 119 may include (and are not limited to) a satellite modem 119a, an analog modem 119b, a cable modem 119c, and an DSL modem 119d. The local proxy 113 uses the communication device 119 to communicate through communication links 130 with the host system 120. The communication links 130 may include various types of communication delivery systems that correspond to the type of communication device 119 being used. For example, if the local proxy 113 includes a satellite modem 119a, then the communications from the devices 112 and the local proxy 113 may be delivered to the host system 120 using a satellite dish 130a and a satellite 130b. The analog modem 119b may use one of several communications links 119, such as the satellite dish 130a and satellite 130b, the Plain Old Telephone Service (POTS) 130c, and the Cable Modem Termination System (CMTS) 130d. The cable modem 119c typically uses the CMTS 130d to deliver and receive communications from the host system 120. The DSL modem 119d typically delivers and receives communications with the host system 120 through a Digital Subscriber Line Access Multiplexer (DSLAM) 130e and an Asynchronous Transfer Mode (ATM) network 130f.

The home networking system 100 may use various protocols to communicate between the devices 112 and the local proxy 113 and between the local proxy 113 and the host system 120. For example, a first protocol may be used to communicate between the devices 112 and the local proxy 113, and a second protocol may be used to communicate between the local proxy 113 and the host system 120. In one implementation, the first protocol and the second protocol may be the same. In another implementation, the first protocol and the second protocol may be different. The local proxy 113 may include different hardware and/or software modules to implement different home networking system protocols.

The local proxy 113 may append parental control information to communications prior to sending the communications to the host system 120. For example, the local proxy 113 may access parental control information 113a that is associated with the identity using the device 112 that is sending the communication, insert the accessed parental control information in the communication, and sent the communication including the parental control information to the host system 120.

Additionally or alternatively, the local proxy 113 may function to filter communications before the communication is sent the host system 120. For instance, the local proxy 113 may apply parental controls to communications sent using one of the devices 112 based on the identity and/or the device that is sending the communication. This may be accomplished by accessing parental control information 113a that is associated with the identity and/or the device that is sending the communication. Access control list information 113b is used to identify destinations that may not be accessed based on the parental control information 113a (e.g., a particular parental control level) associated with the identity and/or the device sending the communication. The communication is sent to the host system 120 only when the access control list information permits the destination to be accessed by the identity and/or device sending the communication.

The local proxy 113 may append device information to communications prior to sending the communications to the host system 120. For example, the local proxy 113 may access device information 113c that is associated with the device that is sending the communication, insert the accessed device information in the communication, and send the communication including the accessed device information to the host system 120.

Device information 113c may be stored in a configuration table or list on the local proxy 113, and may be associated with a device identifier for a device, such as devices 112a-112f. The device identifier may include a hardware device identifier, such as a MAC ("Media Access Control") address, and/or a network address, such as a static IP address associated with the device or a dynamic IP address. The dynamic IP address may be assigned by local proxy 113 or by some other network device or the host system 120 through the Dynamic Host Configuration Protocol or another protocol that enables the dynamic allocation of an IP address to a device on a network. The device information 113c associated with each device may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a Linux™ based personal computer, a PDA, a home appliance, or an entertainment device), and/or the operating environment (e.g., operating system type and/or version).

The local proxy 113 may be configured in a hub-and-spoke configuration in which the functions performed by the local proxy 113 are distributed to other devices (e.g., a parental control device) that are directed by the local proxy 113. Alternatively, for example, the local proxy 113 may be configured to include both the parental control functions and the gateway functions. The local proxy 113 also may be implemented in other network configurations.

Figure 2:
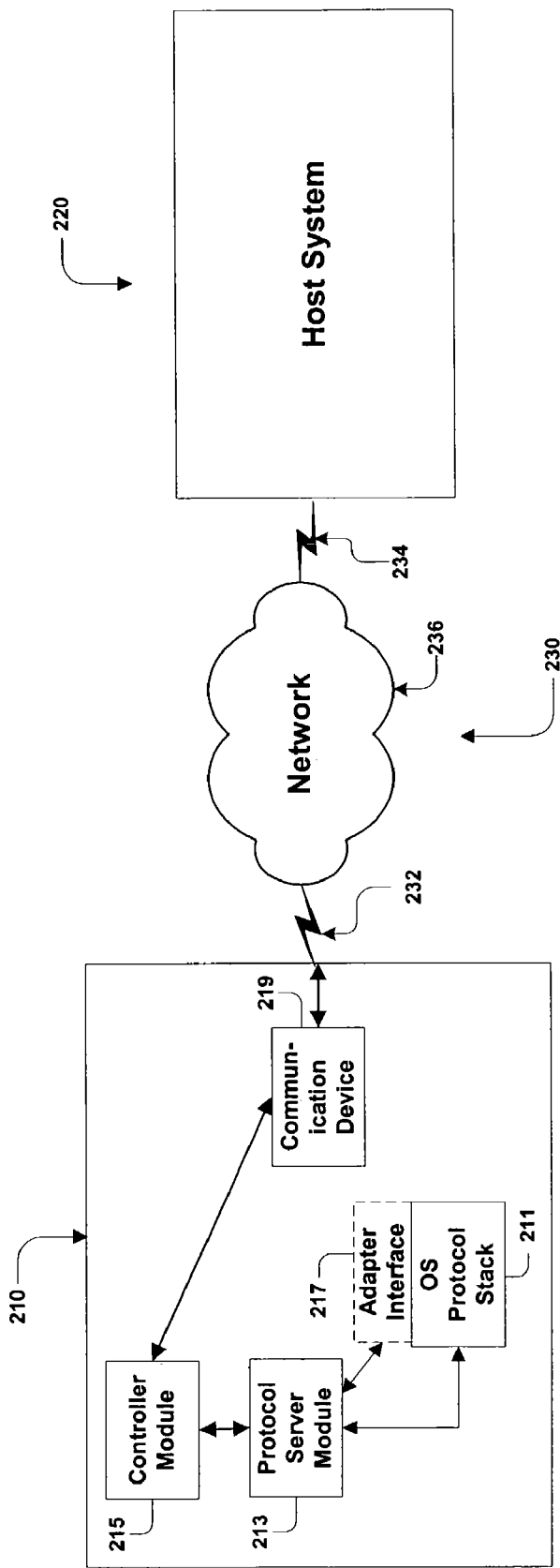

FIG. 2 shows an implementation of a communications system 200 that includes a client system 210, a host system 220, and a communications link 230. The client system 210 may include one or more of an OS protocol stack 211, a protocol server module 213, a controller module 215, an optional adapter interface 217, and a communications device 219. The OS protocol stack 211 may be included as part of an operating system ("OS"). The OS protocol stack 211 may be designed for or capable of enabling the OS to encapsulate data for communication. In general, the OS protocol stack 211 may be implemented using a PPP ("Point-to-Point Protocol") interface. For example, Windows™ OSs generally include a NDISWAN ("Network Device Interface Specification for Wide Area Networks") component that functions as the PPP interface. In some Windows™ OSs and in some other types of OSs, a PPP Daemon (PPPD) may function as the PPP interface.

The protocol server module 213 may be structured and arranged to interface with the client device OS protocol stack 211 and the controller module 215. The protocol server module 213 enables the client system 210 and the host system 220 to communicate through the delivery network 236 using any one of several encapsulating protocols.

The protocol server module 213 may intercept and take over a communications session that the OS protocol stack 211 attempts to initiate with the host system 220 using a first protocol. For example, the OS protocol stack 211 may start a communications session intending to negotiate and exchange configuration data with the host system 220 using the first protocol. Instead, the protocol server module 213 may "spoof" the host system 220 and intercept the communications session from the OS protocol stack 211, rather than having the OS protocol stack 211 communicate directly with the host system 220. The spoofing typically is transparent to the OS protocol stack 211 and the host system 220. By capturing the communications session at the protocol server module 213, the protocol server module 213 may negotiate a separate or a substitute communications session with the host system 220 using a second protocol that is different from the first protocol. Based on this second protocol, data from the OS protocol stack 211 may be routed to the host system 220 over the separate or substitute communications session. Similarly, the protocol server module 213 may be used to spoof the OS protocol stack 211 from the perspective of the host system 220 such that the host system 220 may unknowingly and/or unintentionally transmit to the protocol server module 213 the configuration and/or other data that is destined for the OS protocol stack 211 under the second protocol. The protocol server module 213 then may transport this data to the OS protocol stack 211 using the first protocol.

Data packets that are destined to be communicated between the OS protocol stack 211 and the host system 220 are translated by the protocol server module 213 between the first protocol and the second protocol. For example, when the data packets include encapsulation, the protocol server module 213 may translate the data packets by removing the encapsulation from the data packets. Additionally or alternatively, the protocol server module 213 may translate the data packets by encapsulating previously unencapsulated data packets or re-encapsulating previously encapsulated data packets using any one of several communications protocols.

The protocol server module 213 may interface directly with the OS protocol stack 211, or the client system 210 may further include an interface adapter 217 that the protocol server module 213 uses to interface with the OS protocol stack 211. For instance, in some OSs in which the OS protocol stack 211 is implemented using a PPPD, the protocol server module 213 may interface directly with the PPPD without the need for an interface adapter 217. By contrast, in other OSs, such as the Windows™ OS, in which the OS protocol stack 211 is implemented using NDISWAN, the adapter 217 may be used to interface the protocol server module 213 and the NDISWAN protocol stack. More specifically, for example, a WAN ("Wide Area Network") Miniport adapter 217 may be used as a virtual modem to interface the protocol server module 213 and the NDISWAN.

In one implementation, the protocol server module 213 may include a PPP ("Point-to-Point Protocol") server module. When the protocol server module 213 functions as a PPP server module, it may capture a PPP communications session between the OS protocol stack 211 and the host system 220. The PPP server module also negotiates a PPP communications session with the OS protocol stack 211. The PPP server module may translate PPP data packets from the OS protocol stack 211 destined for the host system 220. For example, the protocol server module 213 may translate the data packets by removing the PPP encapsulation. The data packets may include data packets in a format consistent with, for example, Internet Protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP ("User Datagram Protocol"), L2TP ("Layer Two Tunneling Protocol"), and PPP over Ethernet ("PPPoE")). Additionally, the protocol server module 213 may translate data packets from the host system 220 by removing the encapsulation from the data packets and encapsulating the packets in PPP, and then may transport the packets to the client device OS protocol stack 211.

The protocol server module 213 may append parental control information to packets of data prior to transporting the packets to the host system 220. For example, the protocol server module 213 may access parental control information that is associated with the identity that is sending the communication using the client system 210 and that is stored, for example, on the client system 210 (not shown). The parental control information accessed may be inserted in the communication and transported in the packets of data sent to the host system 220.

Additionally or alternatively, the protocol server module 213 may function to filter packets of data prior to transporting the packets to the host system 220. For instance, the protocol server module 213 may apply parental controls to communications sent using the client system 210 based on the identity that is sending the communication using the client system 210. This may be accomplished by accessing parental control information that is associated with the identity that is sending the communication and accessing an access control list of permitted or restricted addresses based on parental control information that is associated with the identity and that is stored on the client system 210.

The protocol server module 213 may be configured to enable the client system 210 to communicate with the host system 220 using various encapsulating protocols that are supported by the delivery network 236 and the host system 220, regardless of whether these protocols are otherwise supported by the client system 210. For instance, although a client system 210 may support only a PPP encapsulating protocol through its OS protocol stack 211, the protocol server module 213 may function to enable the client system 210 to communicate through the delivery network 236 with the host system 220 using other encapsulating protocols. In a more specific example, the protocol server module 213 generally enables the client system having only a PPP protocol interface to communicate with the host system 220 using, for example, L2TP, PPP, PPPoE, UDP tunneling, token tunneling (e.g., a P3 tunnel), any other encapsulating protocols and tunneling mechanisms, or a combination of these encapsulating protocols and tunneling mechanisms.

The protocol server module 213 may be implemented as a client application or as a software module within a client application. Examples of client applications include AOL ("America Online") client, a CompuServe client, an AIM ("America Online Instant Messenger") client, an AOL TV ("America Online Television") client, and an ISP ("Internet Service Provider") client capable of communicating with other computer users, accessing various computer resources, and viewing, creating, or otherwise manipulating electronic content). The encapsulation may be performed by the protocol server module 213, or alternatively, it may be performed by a separate client application (e.g., PPP client, UDP client, PPPoE client, L2TP client, or AOL client).

The controller module 215 may be logically connected to the protocol server module 213 and may be structured and arranged to control communications between the OS protocol stack 211, the protocol server module 213, and the host system 220. The controller module 215 may be implemented as a client application or as a software module within a client. Additionally, the controller module 215 may function to control the communications device 219.

The communications device 219 typically has the attributes of and includes one or more of the communications devices described above with respect to communications device 119 of FIG. 1.

The communications link 230 may include communications pathways 232, 234 that enable communications through the one or more delivery networks 236. The delivery network 236 that provides a direct or an indirect communications path between the client system 210 and the host system 220, irrespective of physical separation. Examples of a delivery network 236 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, TV, cable, satellite, and/or any other delivery mechanism for carrying data. Each of the communications pathways 232, 234 may include, for example, a wired, wireless, cable or satellite communications pathway.

Figure 3:
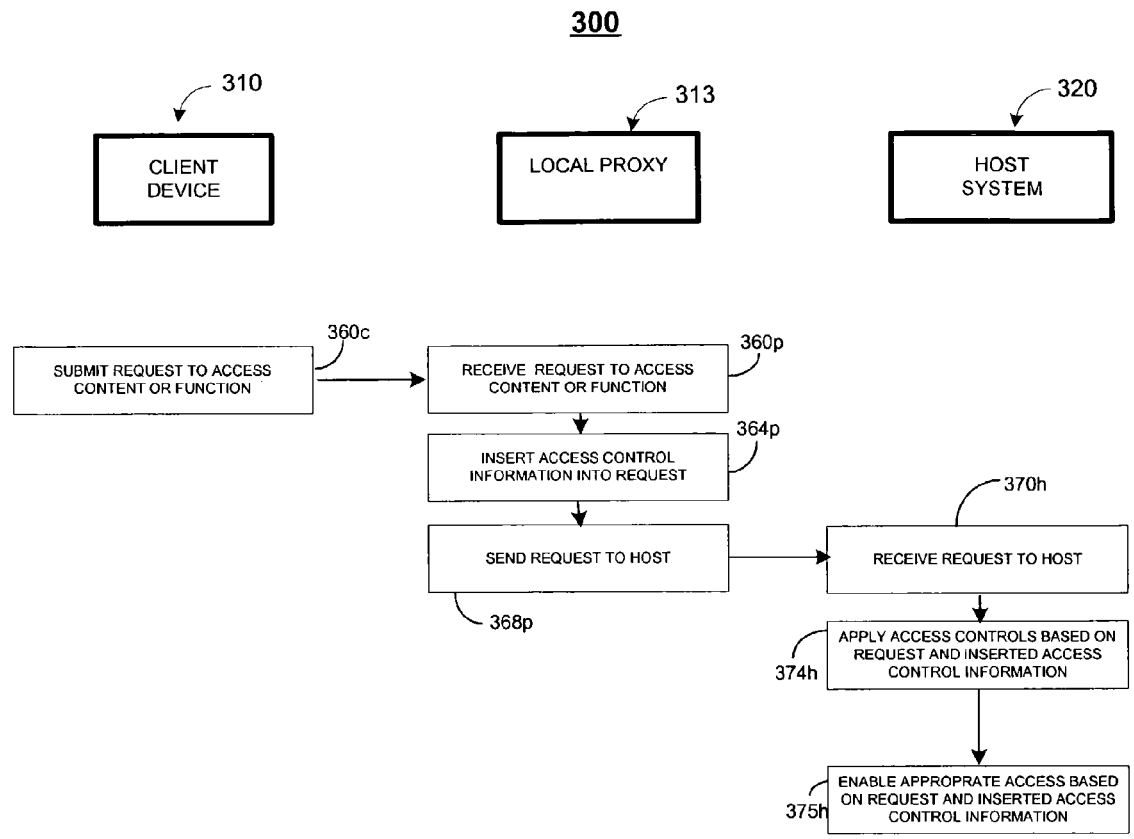
FIGS. 3, 4, 5, and 7 are block diagrams illustrating communications between a device, a local proxy server, and a host system to establish controls for a device used in a home network.
Figure 4:
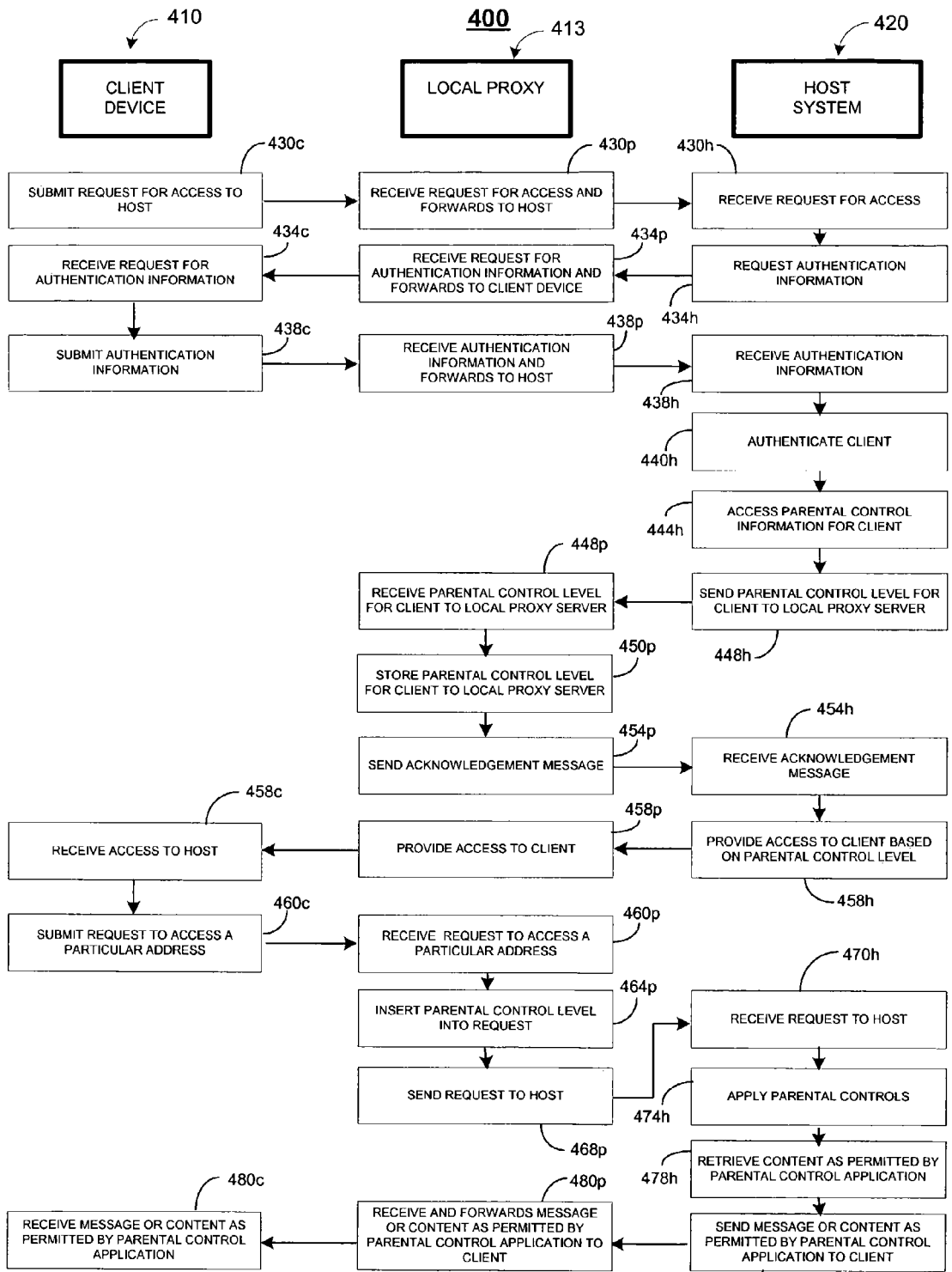

Referring to FIGS. 3 and 4, a procedure 300 or 400 may be used to enable parental controls for a device used in a home network. A client device 310 or 410, such as a Windows™ OS 112a, a personal computer with Linux™-based OS 112b, a Macintosh™ personal computer 112c, or a PDA 112e described previously with respect to FIG. 1, communicates to a local proxy 313 or 413, such as local proxy 113 in FIG. 1 or protocol server module 213 in FIG. 2. The local proxy 313 or 413 communicates with the host system 320 or 420, such as the previously-described host system 120 or 220.

Referring to FIG. 3, an exemplary procedure 300 may be used to enable parental controls for a device used in a home network when access control information associated with the parental controls and the device or the identity associated with the device is stored at the local proxy 313. The access control information may be a mirrored copy of access control information stored by the host system 320.

The procedure 300 begins when the client device 310 submits a request to access some content or a function accessible through the host system 320 (step 360c). The local proxy 313 receives the request to access the content or function (step 360p), and inserts into the request or otherwise associates with the request the access control information associated with the client device 310 or the identity using the client device 310 (step 364p). The local proxy 313 sends the request with the inserted access control information to the host system 320 (step 368p).

The host system 320 receives the request with the access control information (step 370h) and applies access controls based on the request and appended control information (step 374h). For example, the host system 320 may use an access control list that identifies whether the client device 310 or identity using the client device 310 may access the requested content or function. The host system 320 enables appropriate access based on the request and the access control information (step 375h).

Referring to FIG. 4, a procedure 400 is a more specific example of a process to enable parental controls for a device used in a home network. The procedure 400 begins when the client device 410 submits a request for access to the host system 420 (step 430c). The local proxy 413 receives the request for access and forwards the request to the host system 420 (step 430p).

The host system 420 receives the request for access (step 430h) and requests authentication information if not previously provided (step 434h). The local proxy 413 receives the request for authentication information and forwards the request to the client device 410 (step 434p).

The client device 410 receives the request for authentication information (step 434c) and submits authentication information (step 438c). For example, the client device 410 may submit a screen name and password or other authenticating information. The local proxy 413 receives the authentication information and forwards the authentication information on to the host system 420 (step 438p).

The host system 420 receives the authentication information (step 438h) and authenticates the client device 410 (step 440h). If the host system 420 determines that the identity associated with the client device 410 is not an authenticated user, the host system may take any of several actions, including terminating the session immediately, sending a message to the client device 410, or sending a message to a master or supervisory account associated with the local proxy 413.

When the host system 420 determines that the identity associated with the client device 410 is an authenticated user, the host system 420 accesses parental control information for the identity associated with the client device 410 (step 444h). For example, the host system 420 may determine the parental control level associated with the identity associated with the client device 410. This may be accomplished, for example, by using a table indexed by screen name (or otherwise) to lookup the parental control level associated with a particular screen name. As shown below, the table may identify an account, a password, and a parental control level associated with a screen name.

| Master Account | Screen Name | Password | Parental Control Level |
|---|---|---|---|
| SmithFamily | Robert_Smith | 5846%JYNG | Adult |
| SmithFamily | Suzie_Smith | 6748#474V | YoungTeen |
| SmithFamily | Bill_Smith | JHG7868$0 | MatureTeen |
| JonesFamily | Greg_Jones | 85775$#59 | Adult |

The host system sends the accessed parental control information for the identity associated with the client device 410 to local proxy 413 (step 448h). The local proxy 413 receives the parental control information for the identity associated with the client device 410 (step 448p) and stores the parental control information for the identity associated with the client device 410 in transient or persistent storage (step 450p). The local proxy 413 sends an acknowledgment message to the host system 420 (step 454p).

The steps 448p-454h may be referred to as mirroring parental control information. In some implementations, steps the same as or similar to steps 444h-454p may be performed independently of receiving a request for access to the host system from a client device. For example, the local proxy may request parental control information for one or more identities and/or one or more devices upon activation or connection to the host system.

The host system 420 receives the acknowledgment message (step 454h) and provides access to the client device 410 based on parental control information associated with the identity using the client device 410 (step 458h). The local proxy 413 provides access to client device 410 (step 458p), which receives access to the host system 420 (step 458c).

Upon receiving access to the host system, the client device 410 may submit a request to access the content or function associated with a particular address or a range of addresses (step 460c). The local proxy 413 receives the request to access the content or function associated with the address or range of addresses (step 460p), and inserts into or otherwise associates with the request the parental control level for the identity using the client device 410 (step 464p). For example, the local proxy 413 may look-up the parental control information (here, the parental control level) that the local proxy 413 stored in step 450p and append the parental control information (here, the parental control level) to the request received in step 460p. The local proxy 413 sends the request with the inserted parental control information to the host system 420 (step 468p).

The host system 420 receives the request with the parental control information (step 470h) and applies parental controls (step 474h). For example, the host system 420 may access an access control list that identifies the addresses to which a particular parental control level is permitted or denied access, as depicted in the table below.

| Address | Adult Allowed | Mature Teen Allowed | Mature Teen Not Allowed | Young Teen Allowed | Young Teen Not Allowed | Child Allowed | Child Not Allowed |
|---|---|---|---|---|---|---|---|
| 123.45.67.* | X | X | | | X | | X |
| 123.45.68.* | X | | X | | X | | X |

An address that occurs within the range of addresses (here, the range 123.45.67.000 to 123.45.67.999 is indicated by 123.45.67.*) may be accessed by the adult and mature teen parental control levels and may not be accessed by the young teen and child parental control levels. An address that occurs within the range of addresses as indicated by 123.45.68.* (here, 123.45.68.000 to 123.45.68.999) may be accessed only by the adult parental control level and may not be accessed by a mature teen, young teen or child parental control level.

Some implementations may use different data management techniques. For example, the parental control level of adult may not be controlled, and that level may not appear on any access control list for that reason. For example, a particular access control list may include the addresses that are associated with a particular parental control level (e.g., an access control list for a mature teen, another access control list for a young teen, and yet another access control list for a child). Some implementations may include the addresses that a particular parental control level may not access, which may be referred to as a block list or black list for a particular parental control level. Similarly, a particular access control list may include the addresses that a particular parental control level may access, which may be referred to as a white list for a particular parental control level. For example, an access control list may contain the list of addresses that may be accessed by a mature teen, and another access control list may contain the list of addresses that may not be accessed by a young teen.

Alternatively, some implementations may only apply parental controls to communications from client devices when the parental control level associated with the screen name of the identity using the client device corresponds to a particular level or a set of particular levels. In such a case, step 474h may be unnecessary and/or redundant, and therefore may not be performed. For example, when a host system uses parental control levels of adult, mature teen, young teen, and child, the host system may only apply parental controls to communications from client devices when the parental control level associated with the screen name of the identity using the client device is a mature teen, young teen or child, and may not apply parental controls to communications when the parental control level is an adult. In this case, step 474h would not be performed for a device with adult-level access.

The host system 420 retrieves the content as permitted by the parental control application (step 478h). That is, when the application of parental controls in step 474h allows the identity to access the address requested, the host system 420 retrieves the content associated with the address requested (e.g., the World Wide Web page associated with a particular Internet address). When the application of parental controls in step 474h does not allow the identity of the client device 410 to access the requested address, step 478h is not performed.

Some implementations may use one or more heuristic or algorithmic procedures to analyze the content associated with the received address after retrieval to determine whether the content is appropriate for one or more particular parental control levels. For example, a list of keywords may be associated with prohibited content for a particular parental control level or a set of particular parental control levels. When the content is not appropriate for the parental control level of the identity associated with the client device 410, the content is not sent to the local proxy 413.

The host system 420 sends the content as permitted by the application of parental controls to the client device 410 (step 480h). When the identity associated with the client device 410 is permitted to access the requested address and/or the content or a function associated with the requested address, the content is sent to the local proxy 413, and the local proxy 413 receives and forwards the content to client device 410 (step 480p). The client device 410 receives the content (step 480c).

When the identity associated with the client device 410 is not permitted to access the requested address and/or the content or a function associated with the requested address, the host system 420 sends a message indicating that access is not permitted to the local proxy 413 (step 480h). The local proxy 413 receives and forwards the message indicating that access is not permitted to the client device 410 (step 480p), and the client device 410 receives the message (480c).

In some cases the local proxy 413 may apply the parental controls. For example, the local proxy 413 may be used to restrict communications based on one or more access control lists (e.g., in a step similar to 474h) and/or heuristic or algorithmic procedures (e.g., in a step similar to step 478h). The application of parental controls by the local proxy 413 may be advantageous. For example, the local proxy 613 may regulate local content and services provided by the home network, such as the application of parental controls to internal communications between devices (e.g., device-to-device communications).

Figure 5:
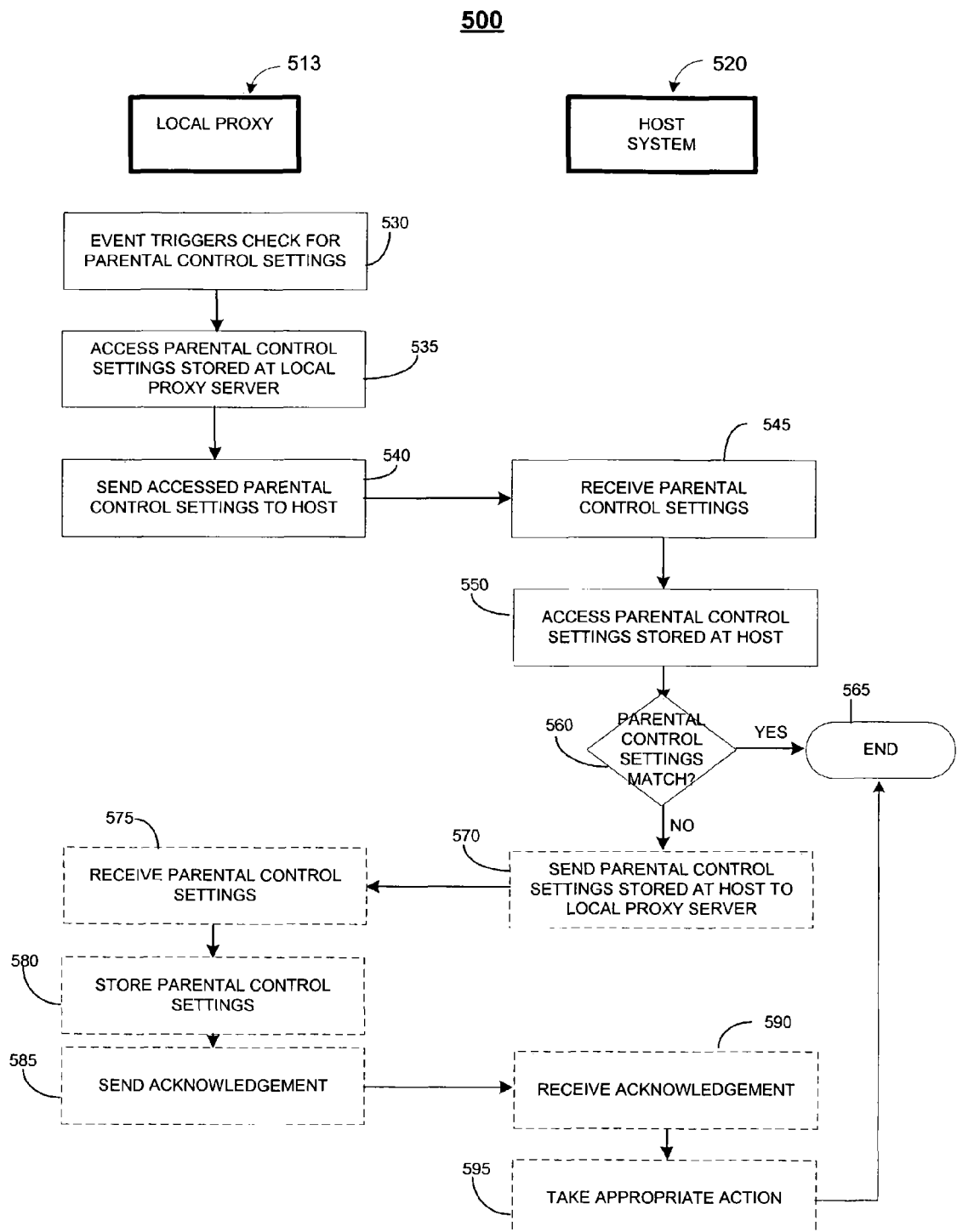

Referring to FIG. 5, a procedure 500 may be used to enable parental controls for a device used in a home network by mirroring host-based parental control settings on the home network. The procedure 500 may be used when parental control settings are stored on a local proxy. The mirroring of host-based parental control settings on the local proxy allows a comparison between the parental control settings on the host system and the locally-stored parental control settings, which may help detect when local parental control settings have been improperly modified or accessed.

Parental control settings may include, for example, the parental control information (such as a parental control level) associated with screen names, and information identifying an account (such as an email address) to which a message should be sent when parental control settings on local proxy 513 do not match parental control settings on the host system 520. Parental control settings for one or more screen names that use local proxy 513 to access the host system 520 may be grouped or otherwise associated with local proxy 513. For example, parental control settings for the screen names may be associated with a particular master user account (such as a family account) or may be associated with local proxy 513. In addition, or as an alternative, some implementations may include parental control information associated with devices connected to the home network, such as client devices a Windows™ OS 112a, a personal computer with a Linux™-based OS 112b, a Macintosh™ personal computer 112c, and a PDA 112e, or a non-client device, such as an intelligent home appliance 112f, as described with respect to FIG. 1.

A local proxy 513, such as local proxy 113 in FIG. 1, protocol server module 213 in FIG. 2, local proxy 313 in FIG. 3, or local proxy 413 in FIG. 4, communicates with the host system 520, such as host system 120, 220, 330, or 430 described previously, to mirror parental control settings. The procedure 500 begins when an event triggers a check for parental control settings at the local proxy server (step 530). Such an event, may include, for example, when the local proxy 513 establishes a new connection to the host system 520, when a new user of a device logs into the host system 520, when a designated user triggers a parental control setting check, when a predetermined amount of time has passed since the last time a parental control setting check was performed, or when a predetermined number of logons has occurred since the last time a parental control setting check was performed. Alternatively or additionally, whether a check for parental control settings is appropriate and/or useful and should be triggered may be determined by the local proxy 513, the host system 520, or another computing device. For example, decision logic that identifies the conditions under which parental control information should be checked may be executed by the local proxy 513.

The local proxy 513 accesses parental control settings stored at the local proxy 513 (step 535). In some cases, the parental control settings may be stored on a storage device that is peripheral to the local proxy 513, such as a peripheral storage device (including a drive, a microdrive, a compact disk (CD), a CD-recordable (CD-R), a CD-rewriteable (CD-RW), flash memory, or a solid-state floppy disk card (SS-FDC)).

The local proxy 513 sends the accessed parental control settings to the host system 520 (step 540). The parental control settings for one or more screen names associated with the local proxy 513 may be sent. In addition or as an alternative to the parental control settings themselves, some implementations may send a checksum that is a number representing the parental control settings transferred from the local proxy 513 to the host system 520.

The host system 520 receives the parental control settings (step 545) and accesses parental control settings stored at the host system 520 and associated with the local proxy 513 (step 550). The host system 520 compares the parental control settings stored at the host system 515 with the parental control settings received from the local proxy 513 (step 560). To do so, the host system 520 may transform the parental control settings into a checksum using the same procedure used by the local proxy 513 to compute the checksum. When the parental control settings (either the parental control settings themselves or the computed checksums that represent the parental control settings on the local proxy 513 and host system 520 respectively) match, the procedure 500 ends (step 565).

Alternatively, when the parental control settings sent by the local proxy 513 and accessed by the host system 520 do not match, the host system 520 sends the correct parental control settings to the local proxy 513 (step 570). The local proxy 513 receives the parental control settings (step 575), stores the parental control settings (step 580), and sends an acknowledgement message to the host system 520 (step 585). The host system 520 receives the acknowledgement message (step 590).

Additionally or alternatively, when the parental control settings sent by the local proxy 513 and accessed by the host system 520 do not match, the host system 520 may take other appropriate action (step 595). Such action may include, for example, notifying the master account holder and terminating access to the host system, as described below with respect to FIG. 6.

Figure 6:
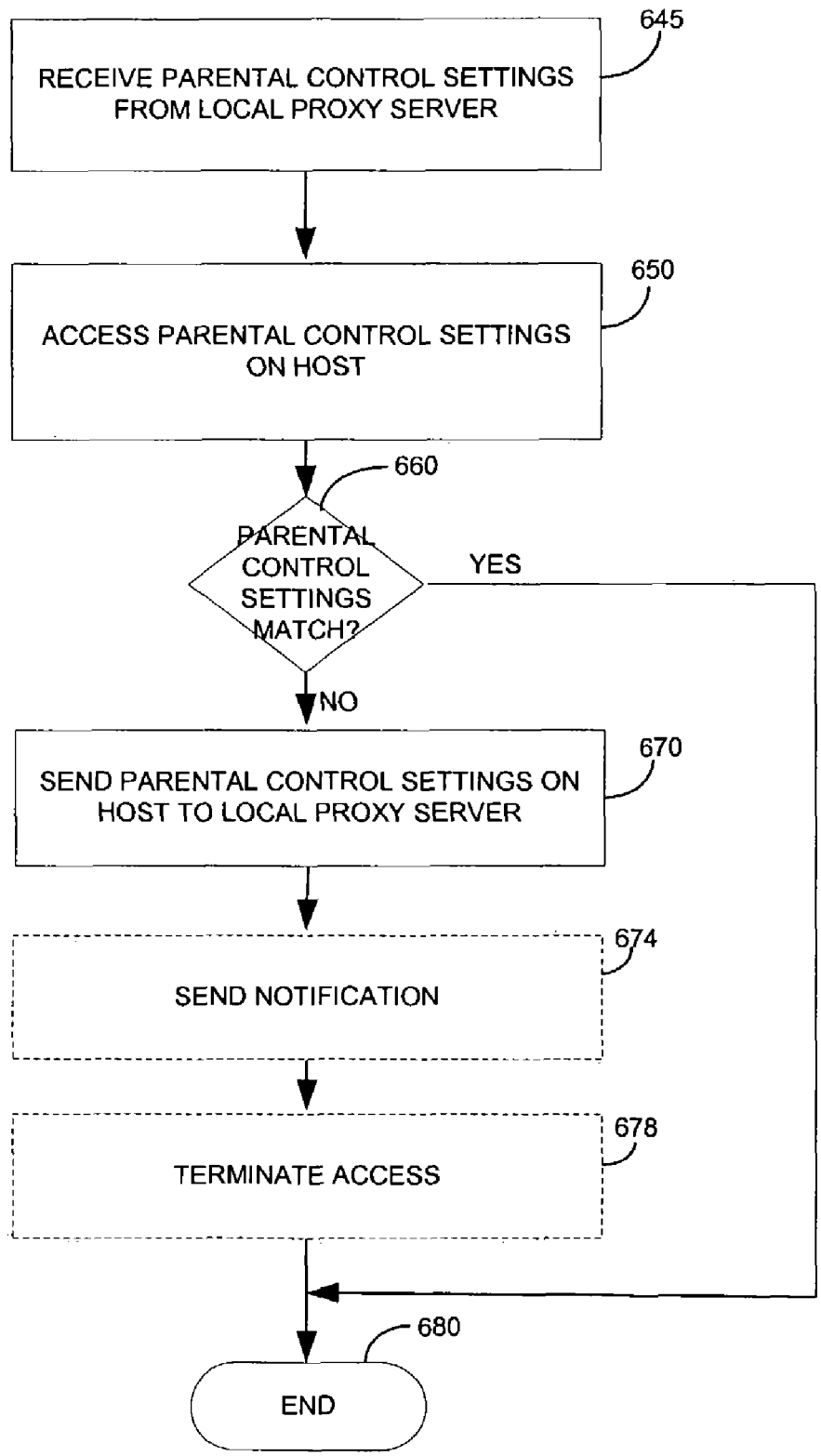
FIGS. 6 and 8 are flow charts of processes performed to establish controls for a device used in a home network.

Referring also to FIG. 6, a process 600 to mirror parental control settings from a host system 520 may begin when the host system 520 receives parental control settings (step 645). For example, the local proxy 513 may submit parental control settings in the manner described previously with respect to item 540 in FIG. 5.

The host system 520 accesses parental control settings (step 650) and compares the parental control settings received from the local proxy 513 to the parental control settings accessed on the host system 520 (step 660). For example, host system 520 may access parental control settings in the manner described previously with respect to step 550 in FIG. 5 and compare the parental control settings in the manner described previously with respect to item 560 in FIG. 5.

When the parental control settings compared do not match, the host system 520 sends parental control settings accessed on the host system 520 to the local proxy 513 (step 670), such as in the manner described previously with respect to item 570 in FIG. 5.

The host system 520 also sends one or more notification messages (step 674). For example, the host system 520 may send a notification message to the holder of the master account that is associated with the local proxy 513, to a home network manager that is associated with the local proxy 513, and/or (when the trigger is associated with one or more identities or devices (e.g., the log on of a new device or new user) the screen name associated with the device. The notification message may constitute an email message, a voice mail message when digital voicemail is integrated into the home network system, an instant message (IM), or another type of alert. The notification message also may be sent to an address provided by the holder of the master account (e.g., a parent's email address at work).

Some implementations may only send one or more notifications when a particular number of changes to parental control settings have occurred or when the frequency of changes to parental control settings has reached a predetermined threshold level.

In some implementations, the host system 520 may terminate access (step 678). For instance, the user session or proxy connection may be terminated when the parental control settings do not match or when the frequency or number of changes to parental control settings has reached a predetermined threshold level.

When the parental control settings received and accessed by the host system 520 match, the procedure 600 ends (step 680).

Alternatively or additionally, the parental control settings may be mirrored between a local proxy and a removable storage device (such as a drive, a microdrive, a compact disc ("CD"), a CD-recordable disk ("CD-R"), a CD-rewriteable disk ("CD-RW"), a flash memory, or solid-state floppy disk cards) using any storage media (including magnetic, optical, or solid state storage media).

Figure 7:
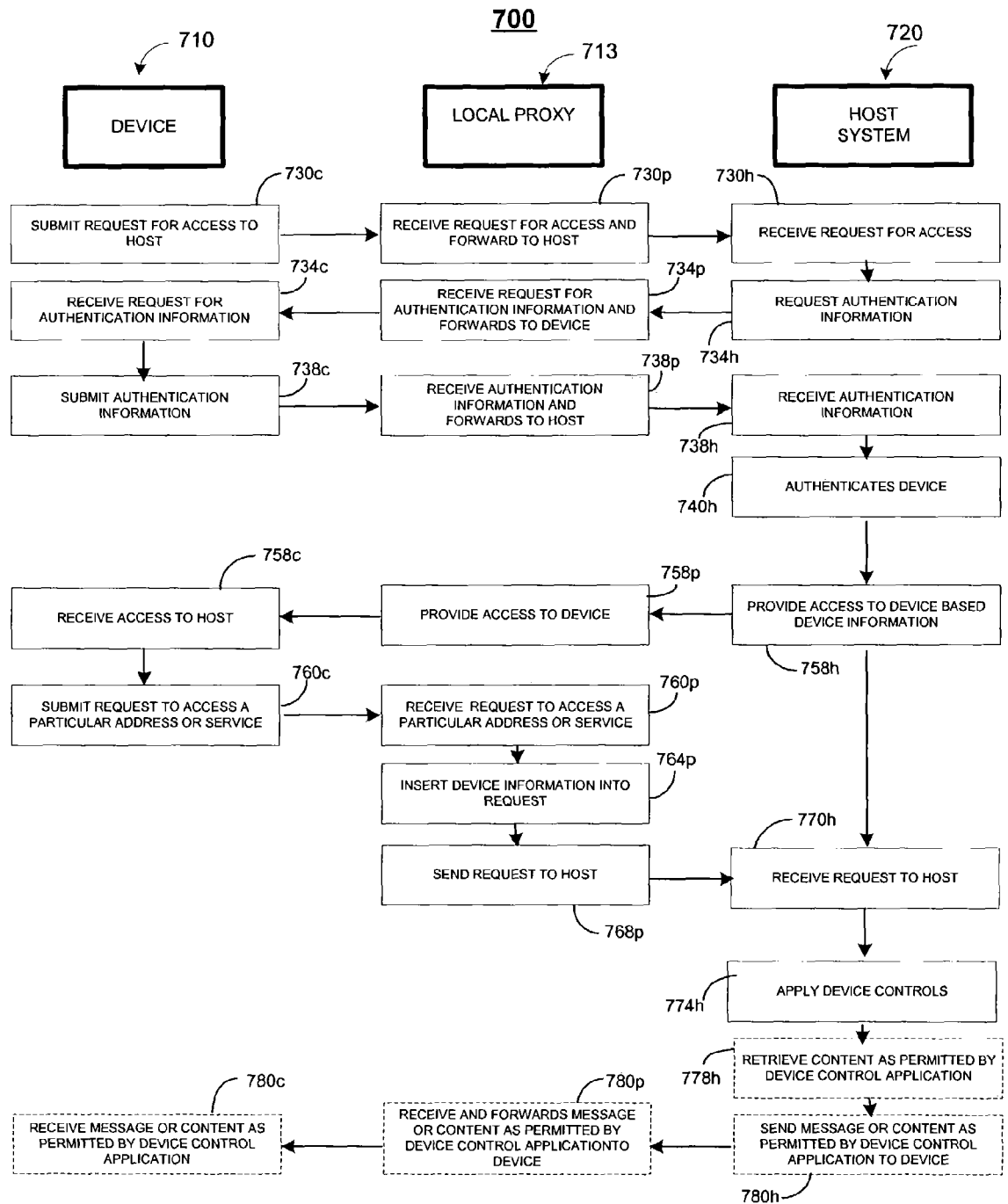

Referring to FIG. 7, a procedure 700 may be used to identify a device used in a home network. A device 710 may be a client device (such as a Windows™ OS 112a, a personal computer with a Linux™-based OS 112b, a Macintosh™ personal computer 112c, and a PDA 112e, described previously with respect to FIG. 1 or client device 310 described previously with respect to FIG. 3) or a non-client device (such as an intelligent home appliance 112f, as described with respect to FIG. 1). Device 710 communicates to a local proxy 713, such as local proxy 113 in FIG. 1, protocol server module 213 in FIG. 2, local proxy 313 in FIG. 3, local proxy 413 in FIG. 4, or local proxy 513 in FIG. 5. The local proxy 713 communicates with the host system 720, such as host system 120 in FIG. 1, host system 220 in FIG. 2, host system 320 in FIG. 3, host system 420 in FIG. 4, or host system 520 in FIG. 5 described previously.

The procedure 700 begins when the device 710 submits a request for access to the host system 720 (step 730c). The local proxy 713 receives the request for access and forwards the request to the host system 720 (step 730p).

The host system 720 receives the request for access (step 730h) and requests authentication information (step 734h). The local proxy 713 receives the request for authentication information and forwards the request to the device 710 (step 734p).

The device 710 receives the request for authentication information (step 734c) and submits the authentication information (step 738c). For example, the device 710 may submit a screen name and password or other authenticating information. The local proxy 713 receives the authentication information and forwards the authentication information to the host system 720 (step 738p).

The host system 720 receives the authentication information (step 738h) and authenticates the device 710 (step 740h). When the host system 720 determines that the device 710 or the identity associated with the device 710 is not authenticated, the host system may take any of several actions, including terminating the session immediately, sending a message to the device 710, or sending a message to an email address that is associated with the parental control information. Some implementations may, for example, send an email message to a master or supervisory account associated with the local proxy 713.

When the host system 720 determines that the device 710 or the identity associated with the device 710 is authenticated, the host system 720 provides access to the device 710 based on parental control information associated with the identity using the device 710 (step 758h). The local proxy 713 provides access to device 710 (step 758p), which receives access to the host system 720 (step 758c).

The device 710 submits a request to access a particular service associated with the host system 720 or a particular address accessible to the host system 720, such as a publicly-accessible IP address (step 760c).

The local proxy 713 receives the request to access the service or IP address (step 760p) and inserts the device information associated with the device 710 into the request (step 764p). For example, the local proxy 713 may look-up device information stored on the local proxy 713 (such as the device information described previously with respect to item 113c in FIG. 1) and insert the device information or a subset of the device information to the request received in step 760p. The local proxy 713 sends the request with the inserted device information to the host system 720 (step 768p).

The host system 720 receives the request with the device information (step 770h) and applies device controls based on the device information received (step 774h). For example, the host system 720 may provide access to a subset of services (such as system functions, features or content) accessible to only particular types of platforms or operating environments. As one example, access to particular entertainment services (such as games) may only be available to particular classes of devices (such as gaming devices and personal computers). To provide access to a subset of services, the host system 720 may look-up on an access control list a list of services that are associated with the device class indicated by the received device information. The host system 720 then may provide access only to the identified services, as depicted in the table below.

| Service | Device Class | Allowed | Not Allowed |
|---|---|---|---|
| Game Service | Gaming Device | X | |
| Game Service | Personal Computer | X | |
| Game Service | PDA | | X |
| Financial Planning Service | Gaming Device | | X |
| Financial Planning Service | Personal Computer | X | |
| Financial Planning Service | PDA | | X |

The table above illustrates that a gaming device is allowed only to access the game service, a personal computer is allowed to access the game service and the financial planning service, and a PDA is not allowed access to the game service or the financial planning service. Some implementations may use an access control list by a device type (e.g., client device or non-client device), a platform, an operating environment, or another manner used to classify devices. In some cases, access control lists may be provided for particular devices. For example, an access control list may be based on a unique identifier for the device on the network, such as a MAC address or an IP address.

Alternatively, the host system 720 may provide a set of common services to all devices and provide access to additional services to particular types of devices. Additionally or alternatively, access control for a device may be based on a parental control level associated with the device in the same or a similar manner to the parental control levels associated with an identity.

Some implementations may use different data management techniques. Some implementations may include the services that a particular device class, device type, platform, operating environment, or individual device may not access (e.g., a block list) or may access (e.g., a white list).

The host system 720 also may provide certain host-maintained preferences, such as personal identification settings, personal web pages, account information, wallet information, and/or financial information only to devices that are capable of receiving that information. To do so, the host system 720 may look-up a list of information that is accessible by the type of device indicated by the received device information and provide access to the appropriate information based on the device type.

When the request by the device 710 is to retrieve content, the steps 778*h* to 780*c* are performed. The host system 720 retrieves the content as permitted by the device controls application (and permitted by security constraints enforced by the host system 720) (step 778*h*). For example, the host system 720 may look up the address of the content requested to determine whether the device is permitted to access the content in a manner similar to that described above with respect to step 774*h*. That is, when the application of device controls in step 774*h* allows the device to access the address requested, the host system 720 retrieves the content associated with the address requested (e.g., the World Wide Web page associated with a particular Internet address). When the application of device controls in step 774*h* does not allow the device 710 to access the requested address, step 778*h* is not performed.

As permitted by the application of device controls, the host system 720 sends the content to the device 710 (step 780*h*). Alternatively, the host system may send a message that explains that the requested content is not accessible by the device. When the device 710 is permitted to access the requested address and/or the content associated with the requested address, the content (or message) is sent to the local proxy 713 (step 780*h*), which receives and forwards the content (or message) to device 710 (step 780*p*). The device 710 receives the content (or message) (step 780*c*).

In some cases, the device 710 itself may not need to be authenticated, such as when the local proxy 713 has established a trusted connection with host system 720 and the device uses the established, trusted connection. In such a case, steps 730*c*-758*c* need not be performed.

Additionally or alternatively, device information may be appended to communications sent from or through the local proxy 713 during the establishment of a connection and/or authentication of the device 710, such as in steps 730*p* and 738*p*. Appending device information to such communications may be particularly beneficial when a host system 720 presents alternative information or features based on a specific communication platform or environment during or after authentication and before a specific access request has been received from the device.

In some implementations, the local proxy 713 may apply device controls, such as the device controls described with respect to steps 774*h* and 778*h*, to a received request, and may send to the host only requests to access permitted content or services.

Figure 8:
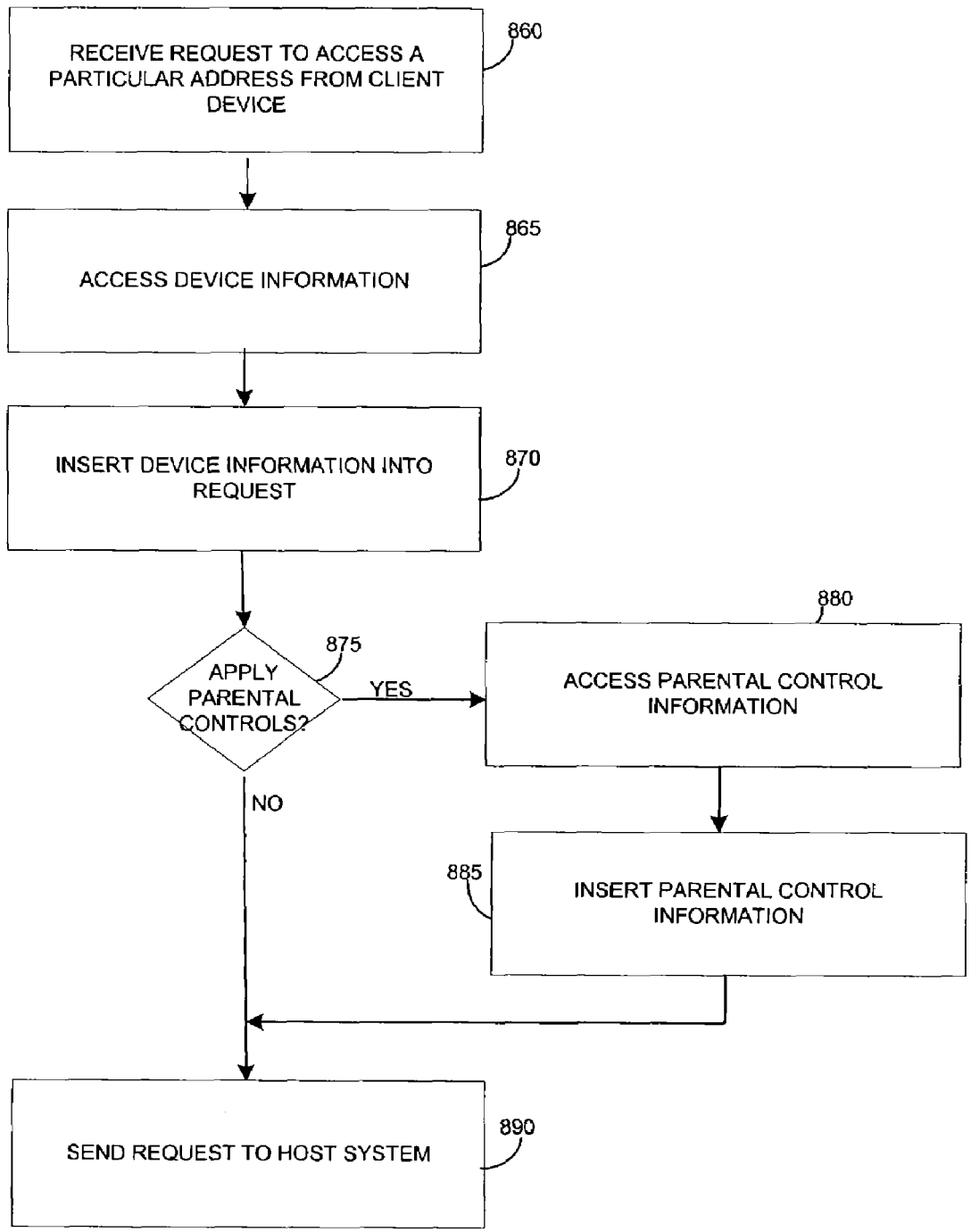

Referring also to FIG. 8, a process 800 to enable parental controls and device identification for a device used in a home network may begin when the local proxy, such as local proxy 113 in FIG. 1, protocol server module 213 in FIG. 2, local proxy 313 in FIG. 3, local proxy 413 in FIG. 4, local proxy 513 in FIG. 5 or local proxy 713 in FIG. 7, receives a request to access a particular address from a device, such as a client device (such as a Windows™ OS 112*a*, a personal computer with a Linux™-based OS 112*b*, a Macintosh™ personal computer 112*c*, and a PDA 112*e* as described previously with respect to FIG. 1, client device 310 in FIG. 3, or client device 410 in FIG. 4) or a non-client device (such as an intelligent home appliance 112*f* as described previously with respect to FIG. 1 or device 710 in FIG. 7) (step 860). The local proxy may receive the request in the same manner as or in a manner similar to that described previously with respect to item 460*p* in FIG. 4 and/or item 760*p* in FIG. 7.

The local proxy accesses device information associated with the device that sent the received request (step 865). The local proxy may, for example, access device information stored in a configuration table or list on the local proxy, a peripheral storage device associated with the local proxy, or another computing device accessible to the local proxy. The device information accessed may include a device identifier and device information associated with the device identifier, such as the type and/or class of device, the type of platform, or the operating system type and/or version, as described with respect to device information 113*c* in FIG. 1.

The local proxy inserts device information into the received request, appends the device information to the received request, or otherwise associates the device information with the received request (step 870). The device information may be the same as or based on the device information accessed. The device information inserted may be a subset of the device information accessed. For example, only the type of device and the platform may be inserted. The same device information values may be inserted as accessed, or the device information values may be transformed prior to insertion. For example, a configuration table stored on the local proxy may store the device type as "client" or "non-client" and the device type sent may be represented as "1" or "0". A translation table (e.g., stored on the local proxy) may be used to transform the device information values.

The local proxy may determine whether to apply parental controls (step 875). For example, the host system may apply parental controls only when the client is a client device and may not apply parental controls when the device is a non-client device. The host system may apply different levels of parental controls (e.g., child, young teen, mature teen, and adult) based on the identity of the user using the device, a default level of parental control for a particular device, and/or a default level of parental control for all devices or other device types (e.g., client or non-client). Alternatively or additionally, the host system may apply parental controls when the client system is not included on a list or table that identifies the user identities or devices to which parental controls are not applied. Other data management techniques may be used, such as using a block list that identifies particular addresses that may not be accessed by a particular parental control level. Parental control information (such as whether to apply parental controls to a particular device and the association of a particular level parental control information with a particular device) that is used in determining whether to apply parental controls and for other uses may be stored on the local proxy, in a manner similar to other parental control information or device information as described with respect to parental control information 113a and device information 113c in FIG. 1.

When parental controls are applied, the local proxy accesses parental control information (step 880). The local proxy may access parental control information differently based on whether the device is a client device or a non-client device. For example, the local proxy may access parental control information associated with the identity using the client device, such as in a manner similar to the manner described with respect to item 444h in FIG. 4. The local proxy may, for example, access parental control information associated with a non-client device by accessing a configuration table or list stored on the local proxy that stores a default parental control level for each device.

The local proxy inserts parental control information into the received request (step 885). The local proxy may insert the parental control information accessed or may transform the parental control information and insert the transformed parental control information.

The local proxy sends the request to the host system (step 890). This step is accomplished in the same or similar manner described with respect to item 468p in FIG. 4 or item 768p in FIG. 7.

Figure 9:
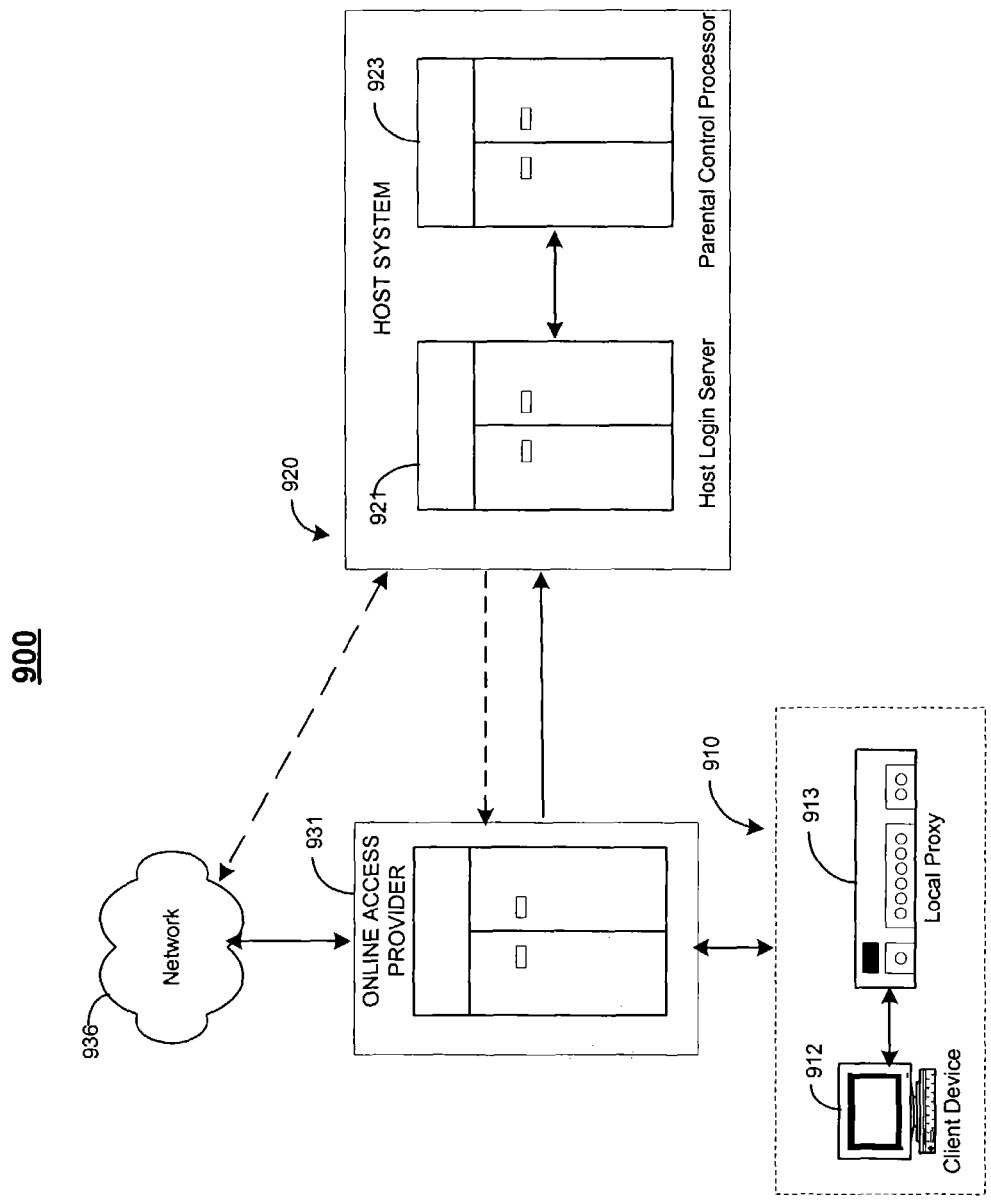
FIG. 9 is a block diagram illustrating a communications system capable of establishing parental controls for a device used in a home network using a host system that applies parental controls and does not provide an online access to the home network.

FIG. 9 illustrates a communications system capable of establishing parental controls for a device used in a home network using a host system that applies parental controls and does not provide online access to the home network and/or its user. A home networking system 900 includes a client system 910 that has a client device 912 and a local proxy 913, a host system 920 that has a host login server 921 and a parental control processor 923, an online access provider 931, and a network 936.

The local proxy 913, such as local proxy 113 in FIG. 1, protocol server module 213 in FIG. 2, local proxy 313 in FIG. 3, local proxy 413 in FIG. 4, local proxy 513 in FIG. 5, or local proxy 713 in FIG. 7, stores parental control information, such as parental control information 113a described above with respect to FIG. 1. The local proxy 913 may maintain a persistent connection to online access provider 931. The persistent connection may be a broadband connection using, for example, a cable modem, such as cable modem 119c as described with respect to FIG. 1, or a DSL modem, such as DSL modem 119d as described with respect to FIG. 1. In some cases, the local proxy 913 may apply parental controls to access requests from client device 912. The local proxy may operate in a manner the same as or similar to the manner described with respect to FIGS. 1, 3, and 4.

The online access provider 931 provides client system 910 with access to network 936. The online access provider 931 may be a host system similar to host system 120 of FIG. 1, host system 220 of FIG. 2, host system 320 of FIG. 3, or host system 420 in FIG. 4. However, the online access provider 931 leverages access controls from other systems, such as parental controls provided by host system 920, for communications received from client system 910. The online access provider 931 routes communications to which parental controls need to be applied to host system 920 for the application of parental controls.

The online access provider 931 may retrieve content from network 936 as permitted by the application of parental controls, and may provide the content to the client system 910. In some implementations, the host system may retrieve the content from the network 936 as permitted by the application of parental controls, and may provide the content to the online access provider 931 for forwarding the content on to client system 910.

The network 936 may be the same as or similar to network 130 in FIG. 1 or network 230 in FIG. 2.

Some implementations may use a transient connection (such as a narrowband or dial-up connection) from local proxy 913 to online access provider 931. In such a case, the local proxy 913 and online access provider 931 may exchange communications that include authentication messages used to establish a trusted connection, for example, such as described above with respect steps 430c-440h in FIG. 4 and steps 730c-740h in FIG. 7.

In some implementations, the online access provider may establish a persistent connection with host system 920. A persistent connection may be particularly beneficial when the number of communications messages routed between the online access provider and the host system 920 is greater than the capacity afforded by a transient connection that requires authentication to be performed when a connection is established. A persistent connection may improve the performance of the application of parental controls by the host system 920 to communications that use access provided by the online access provider 931.

The host system 920 and the online access provider 931 may be the same or different legal entities. Generally, the host system 920 and the online access provider 931 are different legal entities.

Figure 10:
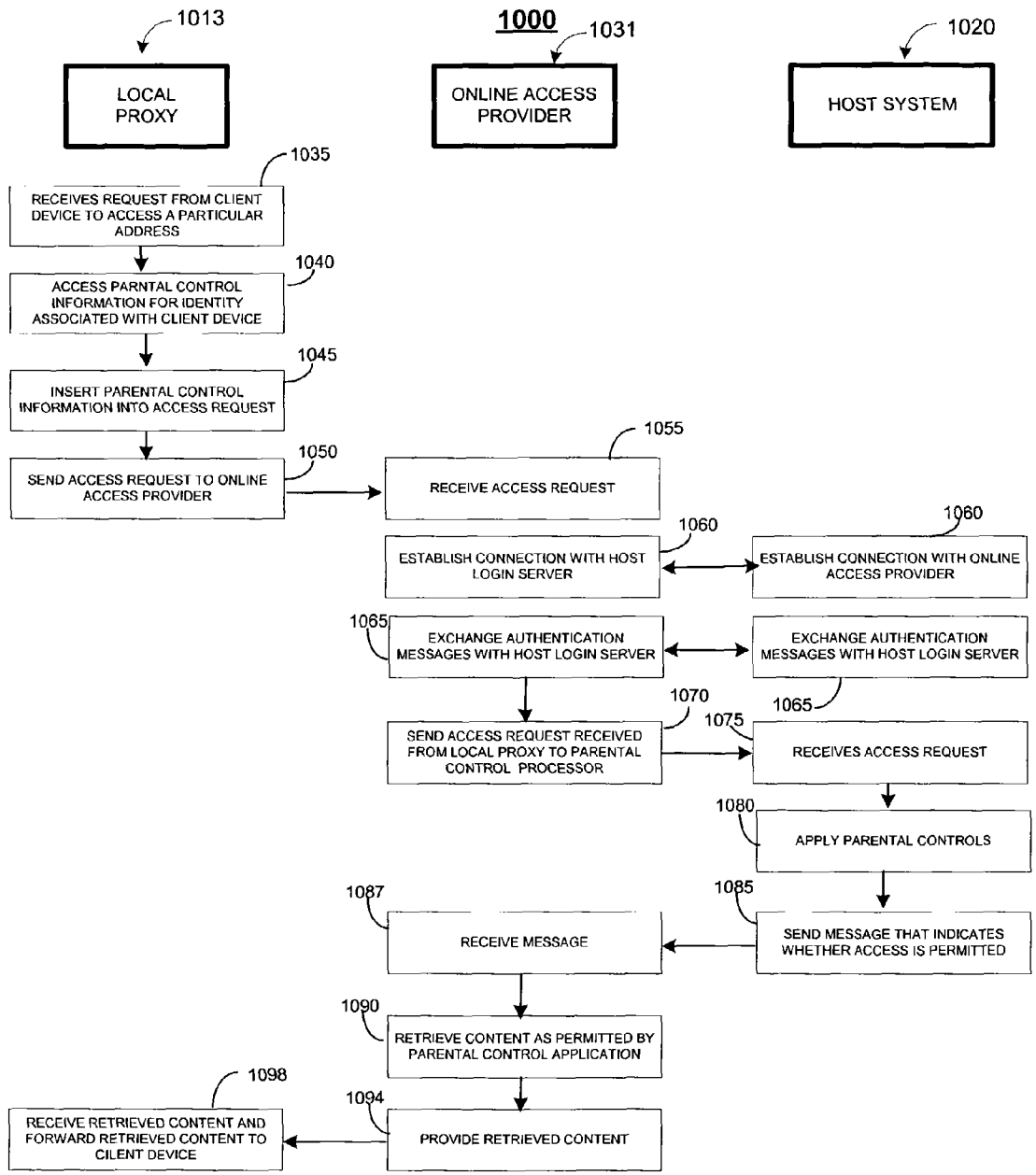
FIG. 10 is a block diagram illustrating communications between a local proxy, an online access provider, and a host system.

Referring to FIG. 10, a process 1000 may establish parental controls for a device used in a home network using a host system that applies parental controls and does not provide online access to the home network and/or its user.

The process 1000 begins when a local proxy 1013, such as local proxy 913 described with respect to FIG. 9, receives a request to access a particular address from a client device, such as a Windows™ OS 112a, a personal computer with a Linux™-based OS 112b, a Macintosh™ personal computer 112c, and a PDA 112e described previously with respect to FIG. 1, client device 310 in FIG. 3, client device 410 in FIG. 4, or client device 912 in FIG. 9, (step 1035). The local proxy 1013 may access parental control information for the identity associated with client device 1012 (step 1040) and insert parental control information into the access request in a manner like or similar to the manner described with respect to FIG. 1 and step 464p in FIG. 4 (step 1045). The local proxy 1013 sends the access request to online access provider 1031 (step 1050).

The online access provider 1031 receives the access request (step 1055) and establishes a connection with the host login server, such as host login server 921 in FIG. 9, or other host system 1020 device used to login users (step 1060). The online access provider 1031 and the host login server 1021 exchange communications to authenticate the online access provider 1031 in a manner like or similar to steps 430c-440h in FIG. 4 or steps 730c-740h in FIG. 7 (step 1065). The online access provider 1031 sends the access request received from the local proxy 1013 to the parental control processor, such as parental control processor 923 in FIG. 9, or other host system 1020 device used for applying parental controls (step 1070). The parental control processor receives the request (step 1075) and applies parental controls to the request (step 1080). This may be accomplished, for example, in a manner the same as or similar to steps 474h-480h in FIG. 4.

The parental control processor 1023 sends to online access provider 1031 a message that indicates whether or not the access request is permitted based on the application of parental controls (step 1085).

The online access provider 1031 receives the message (step 1087). When access is permitted, the online access provider 1031 retrieves the content from network, such as network 936 in FIG. 9, for example, in a manner the same as or similar to the manner described with respect to step 478h in FIG. 4 (step 1090), and provides the retrieved content to the local proxy 1013 in a manner like or similar to the manner described with respect to step 480h in FIG. 4 (step 1094). When access is not permitted, the online access provider 1031 may send a message to local proxy 1013 indicating that access is not permitted (not shown).

The local proxy 1013 receives the retrieved content or message from the online access provider 1031 and forwards the content or message to the client device that requested access to the content (step 1098). This may be accomplished, for example, in the manner described with respect to step 480p in FIG. 4.

The client device receives the content or message from the local proxy 1013 (not shown). This may be accomplished, for example, in the manner described with respect to step 480c in FIG. 4.

Although FIG. 10 describes applying parental controls to a request to access a particular address, other implementations may apply parental controls to other access requests, such as a request to access one or more particular services provided by the online access provider 1031, information accessible on the online access provider 1031, or information or services otherwise accessible using online access provider 1031. Some implementations may apply parental controls to requests from a non-client device.

In one implementation, parental control information may be stored on the local user device and a copy of the parental control information may be stored on a remote device, such as a device at a host system.

Figure 11:
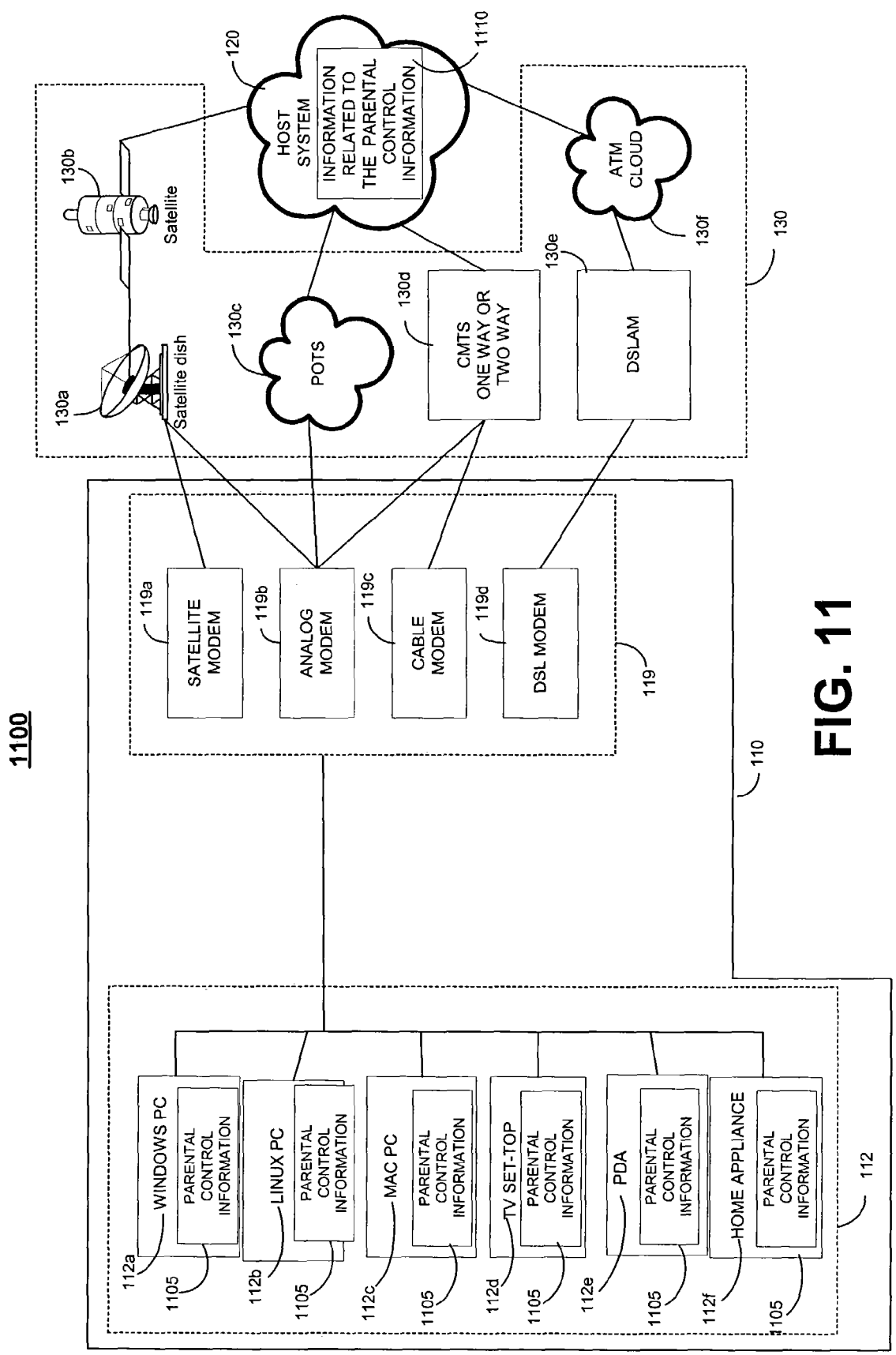
FIG. 11 is a block diagram illustrating a communication system capable of establishing parental controls for a device.

Referring to FIG. 11, a communication system 1100 includes multiple home-networked devices 112 ("devices"). The devices 112 may be connected to each other and to a host system 120 through a communication device 119 over communication links 130. In this implementation, parental control information 1105 is stored within the devices 112. Information 1110 that is related to the parental control information 105 stored within the devices 112 also is stored within the host system 120. The information 1110 may include, for example, a checksum computed based on the parental control information 1105 and/or a copy of the parental control information 1105. When the information 1110 is a copy, the information may be a mirrored copy that is updated in response to authorized changes to the information 1105.

FIG. 11 shows several implementations and possible combinations of devices and systems used within the home networking system 1100. Examples of devices 112 may include, but are not limited to, devices similar to those illustrated and described above with respect to FIG. 1, such as a personal computer with a Windows™ OS 112a, a personal computer with a Linux-based OS 112b, a Macintosh personal computer 112c, a TV set-top box 112d, a PDA 112e, and a home appliance 112f. The devices 112 are connected through a network to the host system 120. The parental control information 1105 stored within the exemplary devices 112 may include the same parental control information on each device or may include different parental control information on each device. That is, the parental control information that is stored on the user device and the information stored on the host system 120 (e.g., a checksum and/or the copy of the parental control information that is stored on the remote device) may include different parental control levels that are associated with a particular screen name (or otherwise), as described above with respect to the table associated with FIG. 4. Similarly, the parental control information may include a range of addresses arranged in a table associated with a particular parental control level for use in determining whether a particular address may be accessed, such as described above with respect to FIG. 4.

In one implementation, the parental control information may be received and stored at the devices 112 from the host system 120 when the devices 112 connect to the host system 120. The parental control information may be received and stored at the devices from the host system 120 each time the devices 112 connect to the host system 120.

Examples of the communication device 119 may include (but are not limited to) communication devices 119 similar to those illustrated and described above with respect to FIG. 1, such as a satellite modem 119a, an analog modem 119b, a cable modem 119c, and a DSL modem 119d. Similarly, communication links 130 may include various types of communication delivery systems that correspond to the type of communication device 119 being used, such as those described and illustrated above with respect to FIG. 1, which include a satellite dish 130a and a satellite 130b, POTS. 130c, CMTS 130d, DSLAM 130e, and ATM network 130f.

In this implementation, the devices 112 may function to filter communications before the communications (e.g., a request for a destination, such as a website) are sent to the host system 120. For instance, the devices 112 may apply the parental control information 1105 to communications that are being sent to the host system 120. Parental control information 1105 and the copy of the parental control information 1110 may include information that is similar to parental control information 113a, access control list information 113b, and device information 113c, as illustrated and described above with respect to FIG. 1.

In another exemplary implementation, the devices 112 may function to filter communications after the communications (e.g., a request for a destination, such as a website) are sent to the host system 120, but before any response to the communications (e.g., a response to the request for the destination) are perceived by the devices 112.

In one implementation, a host system 120 may include information related to the parental control information 1110, such as a copy of the parental control information 1110 which mirrors the parental control information 1105 that is stored within the devices 112. The copy of the parental control information 1110 stored within the host system 120 may be used to determine whether the parental control information 1105 stored within the devices 112 has been altered or changed without authorization. In this manner, the integrity of the parental control information 1105 is maintained by using the copy of the parental control information 1110 stored within the host system 120 to ensure that the locally-stored parental control information 1105 is not tampered with or otherwise compromised. In one implementation, the copy of the parental control information 1110 may be used to determine whether the parental control information 1105 has changed by comparing a copy of the parental control information 1110 stored on the host system 120 with the parental control information 1105 stored on the devices 112. If it is determined that the parental control information 1105 has been changed without authorization, then the copy of the parental control information 1110 stored on the host system 120 is used to update the parental control information 1105 stored on the user device to ensure that inappropriate access requests from the devices 112 to an authorized destination are not allowed.

In another exemplary implementation, a host system 120 may include information related to the parental control information 1110, such as a checksum computed from the parental control information 1105 stored on the devices 112. The checksum of the parental control information stored within the host system 120 may be used to determine whether the parental control information 1105 stored within the devices 112 has been altered or changed without authorization. In this manner, the integrity of the parental control information 1105 is maintained by using the checksum stored within the host system 120 to ensure that the locally-stored parental control information 1105 is not tampered with or otherwise compromised. The checksum may be used to determine whether the parental control information 1105 has changed by comparing the checksums stored on the host system 120 with a checksum stored on the devices 112. If it is determined that the parental control information 1105 has been changed without authorization, then a user may be alerted of the compromise and instructed to update the parental control information stored on the devices 112.

In one implementation, both a checksum and a copy of the parental control information are stored on the host system 120. The checksum is used to determine whether the parental control information 1105 has been changed without authorization. If the parental control information 1105 has been changed without authorization, the copy of the parental control information stored on the host system or elsewhere is used to update the parental control information 1105.

Figure 12:
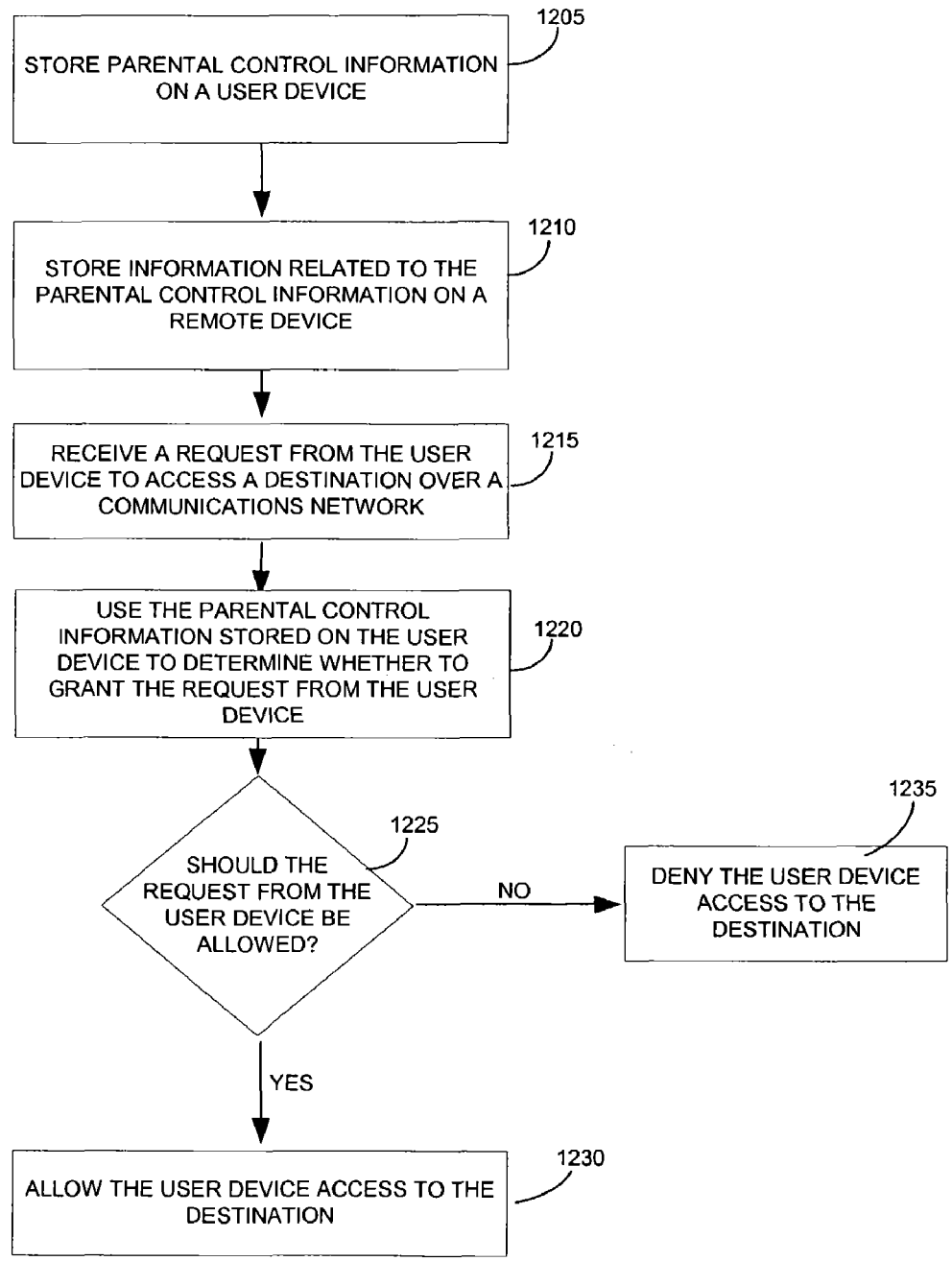
FIG. 12 is a flow chart of an exemplary process performed to establish parental controls for a device.

Referring to FIG. 12, a process 1200 illustrates applying the parental control information stored on the local user device. Process 1200 includes storing parental control information on a user device (step 1205) and storing information related to the parental control information on a remote device (step 1210). As discussed above with respect to FIG. 11, the information related to the parental control information may include, for example, a checksum computed based on the locally-stored parental control information and/or a copy of the parental control information. The remote device may include a device that is part of a host system, such as, the host system 120 described above with respect to FIGS. 1 and 11.

When a request is received from the user device to access a destination over a communications network (step 1215), the parental control information stored on the user device is used to determine whether to grant the request from the user device (step 1220). If it is determined that the request from the device should be allowed (step 1225), then the user device is allowed access to the destination (step 1230). If it is determined that the request from the device should not be allowed (step 1225), then the user device is denied access to the destination (step 1235).

Figure 13:
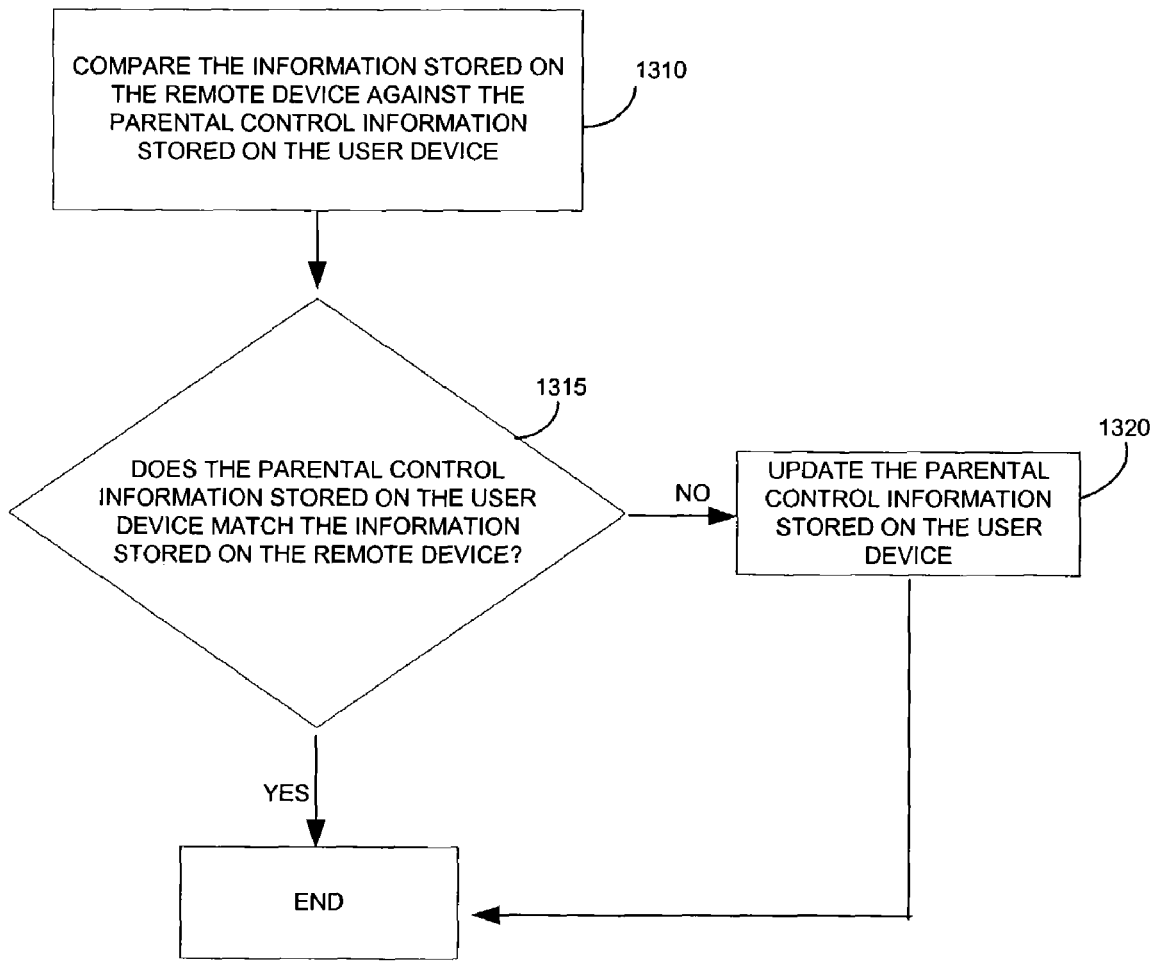
FIG. 13 is a flow chart of an exemplary process performed to verify parental controls for a device.

Referring to FIG. 13, in one implementation, process 1300 illustrates using the information related to the parental control information stored on the remote device to determine whether the parental control information stored on the user device has changed. To determine whether the parental control information stored on the user device has changed, the information stored on the remote device is compared to the parental control information stored on the user device (step 1310). When the parental control information stored on the user device does not match the information stored on the remote device (step 1315), the parental control information stored on the user device is updated (step 1320). A message may be sent to an identity (e.g., a master user or a master account holder) when the information relating to the parental control information stored on the user device does not match the information stored on the remote device. The information stored on the remote device may be used at different times to check the integrity of the parental control information stored on the user device. For example, a comparison may be made periodically, each time a request that has been determined to be allowed is made, or on some other frequency or basis such as the occurrence of an event.

Events that may trigger a comparison of the parental control information may include, for example, when the user device establishes a new connection to the host system, when a new user of a device logs into the host system, when a designated user triggers a parental control setting check, when a predetermined amount of time has passed since the last time a parental control setting check was performed, or when a predetermined number of logons has occurred since the last time a parental control setting check was performed. Alternatively or additionally, design logic that identifies the conditions under which parental control information should be checked may be used to determine when the comparison of the parental control information should take place.

Although FIGS. 1-13 illustrate system communication techniques to be used to communicate between client systems and host systems and FIGS. 1-13 illustrate particular functional implementations, the benefits of such communication techniques are not limited to systems communicating in a client and host relationship, such as an Internet access or service provider or other online service provider, and are equally applicable to other contexts. For example, the benefits are applicable to any desired system that is accessed by a user system, such as in a point-to-point communications system. The techniques described may be implemented by a local proxy server, such as a home network device, such as item 113 described with respect to FIG. 1, or a protocol server module, such as item 213 in FIG. 2.

Furthermore, although the characteristics and features of the various components shown by FIGS. 1, 2, 3, 4, 5, 7, 9, and 11 may differ dramatically based on advancements in the state-of-the-art, the following describes at least one contemplated implementation for those components. A client device, such as client devices 112a, 112b, 112c and 112e of FIGS. 1 and 11, client device 310 of FIG. 3, client device 410 of FIG. 4, or client device 912 of FIG. 9, typically includes a general purpose computer that has an internal or an external storage for storing data and programs such as an operating system (OS) (e.g., DOS ("Disk Operating System"), Windows®, Windows® 95, Windows® 98, Windows® 2000, Windows® NT, Windows® Millennium Edition, Windows® XP, OS/2, and Linux) and one or more application programs. Examples of application programs include authoring applications (e.g., word processing, database programs, spreadsheet programs, presentation programs, and graphics programs) capable of generating documents or other electronic content; client applications (e.g., AOL client, CompuServe client, AIM client, AOL TV client, and an ISP capable of communicating with other computer users, accessing various computer resources, and viewing, creating, or otherwise manipulating electronic content); and browser applications (e.g., Netscape's Navigator and Microsoft's Internet Explorer) capable of rendering standard Internet content.

The general-purpose computer also includes a central processing unit ("CPU") for executing instructions in response to commands from a client controller. In one implementation, the client controller may include one or more of the application programs installed on the internal or external storage of the general-purpose computer. In another implementation, the client controller may include application programs externally stored in and executed by one or more device(s) external to the general-purpose computer.

The general-purpose computer may include a communications device for sending and receiving data. One example of the communications device is a modem. Other examples include a transceiver, a set-top box, a communications card, a satellite dish, an antenna, or another network adapter capable of transmitting and receiving data over the communications link through a wired or wireless data pathway.

The general-purpose computer also may include a television ("TV") tuner for receiving TV programming in the form of broadcast, satellite, and/or cable TV signals. As a result, the client device can selectively and/or simultaneously display network content received by communications device and TV programming content received by the TV tuner.

The general-purpose computer may include an input/output interface that enables a wired or wireless connection to various peripheral devices. Examples of peripheral devices include, but are not limited to, a mouse, a mobile phone, a personal digital assistant (PDA), a keyboard, a display monitor with or without a touch screen input, and/or a TV remote control for receiving information from and rendering information to subscribers. Other examples may include voice recognition and synthesis devices.

Devices such as a mobile telephone, a PDA, and a TV remote control may be peripheral with respect to the general-purpose computer. In some implementations, such devices may themselves include the functionality of the general-purpose computer and operate as the client device. For example, the mobile phone or the PDA may include computing and networking capabilities, and may function as a client device by accessing a network and communicating with a host system. Furthermore, the client system may include one, some or all of the components and devices described above.

The network described, such as network 130 of FIGS. 1 and 11, network 230 of FIG. 2, and network 936 of FIG. 9 also may be referred to as a delivery network.

The techniques and concepts have described inserting control information into a communications request, such as in step 468*p* in FIG. 4, step 764 in FIG. 7, step 885 in FIG. 8, and step 1045 in FIG. 10. Inserting control information includes appending or otherwise adding control information to the communications request. The techniques and concepts may also be applied to other techniques, such as transmitting control information with the communication request. For example, control information may be transmitted with the communication request by sending a communication that may be associated with the communication request.

The features are not limited to computer device contexts. The identification of the particular device or identity in communications from a system and tailoring system-provided information or features to the particular device or identity is equally advantageous to other contexts, such as to tailor TV programs provided over a cable or satellite provider or to restrict telephone access (e.g., to restrict access to a particular area code, such as 900, or regions, such as international or long distance calls). Furthermore, the techniques and concepts described also are applicable to communications internal to the home network.

The parental control information has been illustrated using a set of parental control levels. The benefits of the techniques described are not limited to a system that use parental control levels and are equally applicable to a system that uses other parental control information, such as a binary parental control process in which parental controls are either applied or not applied to a particular device or identity.

The techniques and concepts have been described using parental control information. These techniques are equally applicable to other types of access controls.

Implementations may include a method or process, an apparatus or system, or computer software on a computer medium. It will be understood that various modifications may be made within the following claims. For example, advantageous results still could be achieved if steps of the disclosed techniques were performed in a different order and/or if components in the disclosed systems were combined in a different manner and/or replaced or supplemented by other components.

What is claimed is:

1. A method for using parental controls, the method comprising:
    storing parental control information on a user device;
    receiving a request from the user device to access a destination over a communications network;
    using the parental control information stored on the user device to determine whether to grant the request from the user device;
    allowing the user device access to the destination when the parental control information indicates that the request should be allowed;
    denying the user device access to the destination when the parental control information indicates that the request should be denied;
    storing on a remote device information that is related to the parental control information stored on the user device;
    using the information stored on the remote device to determine whether the parental control information stored on the user device has been altered without authorization of a master account holder for the user device; and
    if the parental control information stored on the user device has been altered without authorization of the master account holder for the user device:
        replacing the altered version of the parental control information stored on the user device with an unaltered version of the parental control information, and
        sending a message to the master account holder for the user device, the message indicating that the parental controls stored on the user device have been altered without authorization of the master account holder for the user device.

2. The method as in claim 1 wherein the information stored on the remote device includes a checksum of a version of the parental control information stored on the user device and using the information stored on the remote device to determine whether the parental control information stored on the user device has been altered without authorization of a master account holder for the user device includes verifying the parental control information stored on the user device using the checksum stored on the remote device.

3. The method as in claim 1 wherein the information stored on the remote device includes a copy of a version of the parental control information stored on the user device and using the information stored on the remote device to determine whether the parental control information stored on the user device has been altered without authorization of a master account holder for the user device includes verifying the parental control information stored on the user device using the copy of the parental control information stored on the remote device.

4. The method as in claim 3 wherein:
    the parental control information stored on the user device includes a checksum computed from the version of the parental control information stored on the user device for the parental controls, and using the information stored on the remote device to determine whether the parental control information stored on the user device has been altered without authorization of a master account holder for the user device includes comparing the checksum stored on the remote device with the checksum stored on the user device.

5. The method as in claim 3 wherein using the information stored on the remote device to determine whether the parental control information stored on the user device has been altered without authorization of a master account holder for the user device includes comparing the copy of the parental control information stored on the remote device with the parental control information stored on the user device.

6. The method as in claim 1 wherein the information stored on the remote device includes a checksum and a copy of the parental control information stored on the user device and using the information stored on the remote device to determine whether the parental control information stored on the user device has been altered without authorization of a master account holder for the user device includes verifying the parental control information stored on the user device using the checksum or the copy of the parental control information stored on the remote device.

7. The method as in claim 1 wherein using the information stored on the remote device to determine whether the parental control information stored on the user device has been altered without authorization comprises doing so periodically.

8. The method as in claim 1 wherein using the information stored on the remote device to determine whether the parental control information stored on the user device has been altered without authorization comprises doing so based on an occurrence of an event.

9. The method as in claim 1 wherein the parental control information includes parental control information that is based on age-appropriateness of a content.

10. The method as in claim 1 wherein the parental control information is indicative of an identity that is signed into the user device.

11. The method as in claim 1 wherein the communications network includes the Internet.

12. The method as in claim 1 wherein the destination includes a web site.

13. A system for using parental controls, comprising:
at least one processor;
a computer-readable storage medium storing a computer program comprising:
   a user device storing code segment that causes the processor to store parental control information on a user device;
   a receiving code segment that causes the processor to receive a request from the user device to access a destination over a communications network;
   a using code segment that causes the processor to use the parental control information stored on the user device to determine whether to grant the request from the user device;
   an access code segment that causes the processor to allow the user device access to the destination when the parental control information indicates that the request should be denied;
   a remote device storing code segment that causes the processor to store on a remote device information that is related to the parental control information stored on the user device; and a verifying code segment that causes the processor to use the information stored on the remote device to determine whether the parental control information stored on the user device has been altered without authorization of a master account holder for the user device;
   a replacing code segment that causes the processor to replace the altered version of the parental control information stored on the user device with an unaltered version of the parental control information when the parental control information stored on the user device has been altered without authorization of the master account holder for the user device, and
   a notification code segment that causes the processor to send a message to the master account holder for the user device when the parental control information stored on the user device has been altered without authorization, the message indicating that the parental controls stored on the user device have been altered without authorization of the master account holder for the user device.

14. The system of claim 13 wherein the information stored on the remote device includes a checksum of a version of the parental control information stored on the user device and the verifying code segment causes the computer to verify the parental control information stored on the user device using the checksum on the remote device.

15. The system of claim 13 wherein the information stored on the remote device includes a copy of a version of the parental control information stored on the user device and the verifying code segment causes the computer to verify the parental control information stored on the user device using the copy of the parental control information stored on the remote device.

16. The system of claim 15 wherein:
the parental control information stored on the user device includes a checksum computed from the version of the parental control information stored on the user device for the parental controls, and
the verifying code segment causes the computer to compare the checksum stored on the remote device with the checksum stored on the user device.

17. The system of claim 15 wherein the verifying code segment causes the computer to compare the copy of the parental control information stored on the remote device with the parental control information stored on the user device.

18. The system of claim 13 wherein the information stored on the remote device includes a checksum and a copy of the parental control information stored on the user device and the verifying code segment causes the computer to verify the parental control information stored on the user device using the checksum or the copy of the parental control information stored on the remote device.

19. The system of claim 13 wherein using the information stored on the remote device to determine whether the parental control information stored on the user device has been altered without authorization of a master account holder for the user device comprises doing so periodically.

20. The system of claim 13 wherein using the information stored on the remote device to determine whether the parental control information stored on the user device has been altered without authorization of a master account holder for the user device comprises doing so based on an occurrence of an event.

21. The system of claim 13 wherein the parental control information includes parental control information that is based on age-appropriateness of a content.

22. The system of claim 13 wherein the parental control information is indicative of an identity that is signed into the user device.

23. The system of claim 13 wherein the communications network includes the Internet.

24. The system of claim 13 wherein the destination includes a web site.

25. A computer-readable storage medium storing a computer program, the computer program comprising:
- a user device storing code segment that causes a computer to store parental control information on a user device;
- a receiving code segment that causes the computer to receive a request from the user device to access a destination over a communications network;
- a using code segment that causes the computer to use the parental control information stored on the user device to determine whether to grant the request from the user device;
- an access code segment that causes the computer to allow the user device access to the destination when the parental control information indicates that the request should be allowed;
- a denial code segment that causes the computer to deny the user device access to the destination when the parental control information indicates that the request should be denied;
- a remote device storing code segment that causes the computer to store on a remote device information that is related to the parental control information stored on the user device; and
- a verifying code segment that causes the computer to use the information stored on the remote device to determine whether the parental control information stored on the user device has been altered without authorization of a master account holder for the user device;
- a replacing code segment that causes the computer to replace the altered version of the parental control information stored on the user device with an unaltered version of the parental control information when the parental control information stored on the user device has been altered without authorization of the master account holder for the user device, and
- a notification code segment that causes the computer to send a message to the master account holder for the user device when the parental control information stored on the user device has been altered without authorization, the message indicating that the parental controls stored on the user device have been altered without authorization of the master account holder for the user device.

26. The computer-readable storage medium of claim 25 wherein the information stored on the remote device includes a checksum of a version of the parental control information stored on the user device and the verifying code segment causes the computer to verify the parental control information stored on the user device using the checksum stored on the remote device.

27. The computer-readable storage medium of claim 25 wherein the information stored on the remote device includes a copy of a version of the parental control information stored on the user device and the verifying code segment causes the computer to verify the parental control information stored on the user device using the copy of the parental control information stored on the remote device.

28. The computer-readable storage medium of claim 27 wherein:
- the parental control information stored on the user device includes a checksum computed from the version of the parental control information stored on the user device for the parental controls, and
- the verifying code segment causes the computer to compare the checksum stored on the remote device with the checksum stored on the user device.

29. The computer-readable storage medium of claim 27 wherein the verifying code segment causes the computer to compare the copy of the parental control information stored on the remote device with the parental control information stored on the user device.

30. The computer-readable storage medium of claim 25 wherein the information stored on the remote device includes a checksum and a copy of the parental control information stored on the user device and the verifying code segment causes the computer to verify the parental control information stored on the user device using the checksum or the copy of the parental control information stored on the remote device.

31. The computer-readable storage medium of claim 25 wherein using the information stored on the remote device to determine whether the parental control information stored on the user device has been altered without authorization of a master account holder for the user device comprises doing so periodically.

32. The computer-readable storage medium of claim 25 wherein using the information stored on the remote device to determine whether the parental control information stored on the user device has been altered without authorization of a master account holder for the user device comprises doing so based on an occurrence of an event.

33. The computer-readable storage medium of claim 25 wherein the parental control information includes parental control information that is based on age-appropriateness of a content.

34. The computer-readable storage medium of claim 25 wherein the parental control information is indicative of an identity that is signed into the user device.

35. The computer-readable storage medium of claim 25 wherein the communications network includes the Internet.

36. The computer-readable storage medium of claim 25 wherein the destination includes a web site.

37. A method for using parental controls, the method comprising:
- storing first parental control information on a first user device;
- storing second parental control information on a second user device;
- storing on a remote device information that is related to the first parental control information stored on the first user device;
- storing on the remote device information that is related to the second parental control information stored on the second user device;
- using the information stored on the remote device to determine whether the first parental control information stored on the first user device has been altered without authorization of a first master account holder for the first user device;
- if the parental control information stored on the first user device has been altered without authorization of the first master account holder for the first user device:
  - replacing the altered version of the first parental control information stored on the first user device with an unaltered version of the first parental control information, and
- sending a first message to the first master account holder for the first user device, the first message indicating that the first parental controls stored on the first user device have been altered without authorization of the first master account holder for the first user device; using the information stored on the remote device to determine whether the second parental control information stored on the second user device has been altered without authorization of a second master account holder for the second user device; and if the parental control information stored on the second user device has been altered without authorization of the second master account holder for the second user device:

replacing the altered version of the second parental control information stored on the second user device with an unaltered version of the second parental control information, and sending a second message to the second master account holder for the second user device, the second message indicating that the second parental controls stored on the second user device have been altered without authorization of the second master account holder for the second user device.

* * * * *